United States Patent
Honda

(10) Patent No.: US 6,499,067 B1
(45) Date of Patent: Dec. 24, 2002

(54) SERIAL COMMUNICATION APPARATUS AND SERIAL COMMUNICATION SYSTEM

(75) Inventor: Takayoshi Honda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/511,947

(22) Filed: Feb. 23, 2000

(30) Foreign Application Priority Data

Feb. 25, 1999  (JP) ............................................ 11-048221

(51) Int. Cl.$^7$ ................................................ G06F 3/00
(52) U.S. Cl. ............................... 710/5; 710/20; 710/61; 713/400; 712/243
(58) Field of Search .............................. 710/1, 3, 5, 7, 710/12, 20, 29, 58, 61, 100, 131; 713/400, 401; 712/225, 243; 709/201

(56) References Cited

U.S. PATENT DOCUMENTS

| | | | | |
|---|---|---|---|---|
| 4,101,838 A | * | 7/1978 | Aihara et al. ................. | 328/63 |
| 4,694,294 A | * | 9/1987 | Suzuki et al. .......... | 340/825.14 |
| 4,953,158 A | * | 8/1990 | Schreue ..................... | 370/60.1 |
| 5,394,022 A | * | 2/1995 | Murakami et al. .......... | 327/176 |
| 5,710,928 A | * | 1/1998 | Atkinson ..................... | 711/10 |
| 6,157,999 A | * | 12/2000 | Rossbach et al. ........... | 712/243 |
| 6,240,403 B1 | * | 5/2001 | Shah et al. ................. | 705/408 |

FOREIGN PATENT DOCUMENTS

| | | |
|---|---|---|
| JP | 9-282265 | 10/1977 |
| JP | 53-118325 | 10/1978 |
| JP | 2719734 | 11/1997 |

\* cited by examiner

Primary Examiner—Jeffrey Gaffin
Assistant Examiner—Rijue Mai
(74) Attorney, Agent, or Firm—Nixon & Vanderhye P.C.

(57) ABSTRACT

A serial communication system, which can improve a communication speed even when it takes long time to perform a process in accordance with a command. A serial communication apparatus includes a first and a second microcomputer, each of which has a relationship of a master/a slave. Each of the first and the second microcomputer has a CPU, a ROM, a RAM, a communication control portion, a serial communication block and so on. A serial communication clock (SCLK) is continuously sent from the first microcomputer to the second microcomputer. The serial communication block of each of the microcomputers has a pair of exchangeable shift registers. Each of the communication control portions reads a signal (SRXD) sent from the opposite side microcomputer by 16 clocks, and performs processes based on a process command in the read signal (SRXD) during the next 16 clocks. Furthermore, the communication control portion sends a processed result (STXD) corresponding the process command to the opposite side microcomputer during further next 16 clocks.

13 Claims, 16 Drawing Sheets

FIG. 2A
A/D CONV REQUEST

| A/D CONV COMMAND | CONV ch | — |

FIG. 2B
COMM DATA OF MICROCOMPUTER
SECOND → FIRST

RESPONSE FOR A/D CONV REQUEST

| CONV ch | F | A/D CONV RESULT |

FIG. 2C
RAM WRITE REQUEST

| RAM WRITE COMMAND | WRITE ADDRESS | WRITE DATA |

FIG. 2D
RESPONSE FOR RAM WRITE REQUEST

| RAM WRITE COMMAND | WRITE ADDRESS | F | — |

FIG. 2E
RAM READ REQUEST

| RAM READ COMMAND | READ ADDRESS | — |

FIG. 2F
RESPONSE FOR RAM READ REQUEST

| RAM READ COMMAND | READ ADDRESS | F | READ DATA |

FIG. 2G
RESPONSE FOR WRONG COMMAND

| REQUEST COMMAND | REQUEST ADDRESS | F | — |

COMM DATA OF MICROCOMPUTER
FIRST → SECOND

FIG. 10A

CONT A/D CONV REQUEST

| CONT A/D COMMAND | CONV START ch | NUMBER OF CONV ch | — |
|---|---|---|---|

FIG. 10B

CONT A/D CONV RESULT FETCH REQUEST

| A/D RESULT EXTRACT COMMAND | EXTRACT ch | — |
|---|---|---|

FIG. 10C

RESPONSE CONT A/D CONV REQUEST FETCH REQUEST

| EXTRACT ch | F | A/D CONV RESULT |
|---|---|---|

SERIAL COMMUNICATION APPARATUS AND SERIAL COMMUNICATION SYSTEM

CROSS REFERENCE TO RELATED APPLICATION

This application is based upon Japanese Patent Application No. Hei. 11-48221 filed on Feb. 25, 1999, the contents of which are incorporated herein by reference.

BACKGROUND OF THE INVENTION

1. Field of the Invention

This invention relates to serial communication techniques, and particular to a serial communication technique applicable to an electronic control unit (ECU) of, for example, a vehicle engine, and further particular to a serial communication method and a serial communication apparatus performing a serial communication between external serial communication apparatus.

2. Related Art

Conventional serial communication apparatus is disclosed in JP A 9-282265. This serial communication apparatus is constructed so that data (message) is bidirectionally serial-communicated between two microcomputers having a relationship of a master and a slave therebetween. For example, a master microcomputer controls principal engine performs controls such as an ignition timing control and a fuel injection control; and a slave microcomputer performs the other supplemental controls such as an A/D (analog-digital) conversion of sensed data by some kinds of sensor, which are needed for the engine control, and a load calculation. Here, according to the conventional serial communication apparatus, the message is sent in synchronization with a serial communication clock. The message communicated between the microcomputers includes A/D converted data, data read from a RAM, and request commands for each of the processes.

In the actual data communication, a process completion signal (EOCT signal in FIG. 6 of the above-described JP) temporally rises to a logically high level in synchronization with a first trailing edge of the clock, and messages stored in each of shift registers are exchanged each other. After the exchange of the message is completed, the clock is stopped, and the process completion signal (EOCT) falls to a logically low level in synchronization with the clock's stop. After that, the slave microcomputer performs predetermined process such as the A/D conversion or reading RAM data in accordance with the request command in the message received from the master microcomputer, and rises the process completion signal (EOCT) at the point when the process is completed. The master microcomputer judges a condition that the data is prepared to be sent due to the rising the process completion signal (EOCT) to the logically high level, and resets the clock so that next message is sent to the slave microcomputer.

According to the above-described JP A 9-282265, the communication is suspended due to the clock's stop while the slave microcomputer performed the predetermined process in accordance with the request command (during EOCT=L in FIG. 6 in the JP). Particularly, in the case where it takes long time to process in the slave microcomputer such that when the request from the master microcomputer is the A/D conversion, a suspended time will be prolonged. Therefore, a suspended time, during which the communication is suspected (ended), is prolonged compared to a time during which the communication is performed, and it becomes hard to improve a communication speed. Furthermore, in this conventional apparatus, it is essential to provide a slave response communication line (EOCT line), and therefore it is inconvenience when a structure is simplified.

On the contrary, it would be thought a countermeasure in which the next message (command and data) is sent after a predetermined interval without applying the slave response communication line (EOCT line). That is, after the slave microcomputer receives the message in synchronization with the clock, the slave microcomputer performed predetermined process (the A/D conversion or the writing RAM) in accordance with the request command. After that, the slave microcomputer receives the next message every a predetermined period (interval) (e.g., 40 $\mu$s) within which processes of the slave microcomputer is definitely completed. In this case, the master microcomputer sends the next message every the predetermined period 40 $\mu$s regardless of the fact whether the slave microcomputer has completed its process or not. Here, whether the process in the slave microcomputer is accurately completed or not is judged from an ID (identification) bit in the message sent from the slave microcomputer.

According to the countermeasure, the slave response communication line (EOCT line) can be omitted, however, it still contains a problem that the communication time is further prolonged compared to the conventional apparatus in JP A 9-282265, because it needs to send the next message after waiting the predetermined interval (40 $\mu$m) within which processes of the slave microcomputer is definitely completed.

Furthermore, as another countermeasure, it would be thought that the clock is not ended until the sending of all messages is completed, however, the process in the slave microcomputer may be prolonged when the request command from the master microcomputer includes certain command, which needs long time, such as a reading of the RAM data, a writing of the RAM data or the A/D conversion. Hence, it is difficult to actually apply to a commercial model.

On the contrary, another conventional serial communication apparatus is disclosed in Japanese Granted Patent No. 2719734. According to the another conventional apparatus, a clock communication line, a master data communication line, a slave data communication line, a synchronously initialize request control line and a slave response control line are provided between a master apparatus and a slave apparatus. The master apparatus sends a synchronously initialize request in synchronization with a start of sending of a master data or with a start of receiving of a slave data; and slave apparatus sends a slave response both after receiving the master data and before sending the slave data. However, this apparatus also contains problems such that communication is suspended when the command is processed, and that it needs slave response communication line.

SUMMARY OF THE INVENTION

This invention has been conceived in view of the background thus far described and its first object is to improve a communication speed even when it takes long time to perform a process in accordance with a command.

Its second object is to provide a serial communication system having a simple structure.

According to the present invention, a serial communication apparatus comprises: a plurality of registers; a switcher for alternately switching the condition of the registers every a predetermined numbers of serial communication clock; and a communication controller. Here, when serial communication is performed by using one register under the communication condition, a communication controller performs a process based on a process command, which is externally inputted and is received by another register last time, in the another register under the non-communication condition, and outputs a process result in accordance with the process command.

According to the above-described structure, the serial communication is performed by using one register, and at the same time, a process in accordance with a process command received last time is performed and a process result is outputted. Furthermore, when the register is switched after the predetermined number of serial communication clock passes, the process result in accordance with the process command is registered in the register, which has used for performing the serial communication; and the process result having registered before switching is outputted.

In this way, by alternately using a plural of registers, the process command just after being received can be temporally escaped, and a process in accordance with the escaped process command can be performed in the register at which the process command escapes. Therefore, when it takes long time to complete the process corresponding to the process command, it does not need to stop the communication every command. Hence the communication speed can be improved. Furthermore, it is not essential to ascertain whether a preparation of the communication has completed or not every communication corresponding predetermined clocks. Therefore, it does not need to provide a slave response communication line (e.g., the EOCT line in JP A 9-282265), so that the structure can be simplified.

According to another aspect of the present invention, a serial communication apparatus comprises: a first register; a second register; and a communication controller. The communication controller transfers the communication data in a first register to a second register when the first register receives communication data corresponding to a predetermined numbers of serial communication clock, registers a process result in accordance with the process command included in the communication data into the second register, transfers the process result in the second register to the first register after the predetermined numbers of serial communication clock passes, and registers communication data received after the predetermined numbers of serial communication clocks passes into the second register.

According to the above-described structure, at the second register, after receiving the communication data corresponding to a predetermined numbers of serial communication clock, a process in accordance with the command data included in the communication data is performed and a process result thereof is registered. After the predetermined numbers of serial communication clock passes, the process result in the second register is transferred to the first register and the next communication data is registered in the second register. The present invention according to another aspect can be achieved the same result as the above-described present invention.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIGS. 2A–2G are schematic diagrams illustrating serial data structures of each request type in the first embodiment;

FIGS. 10A and 10B are schematic diagrams illustrating serial data structures of continuous A/D conversion request in the first embodiment;

DESCRIPTION OF THE PREFERRED EMBODIMENTS

First Embodiment

Figure 1:
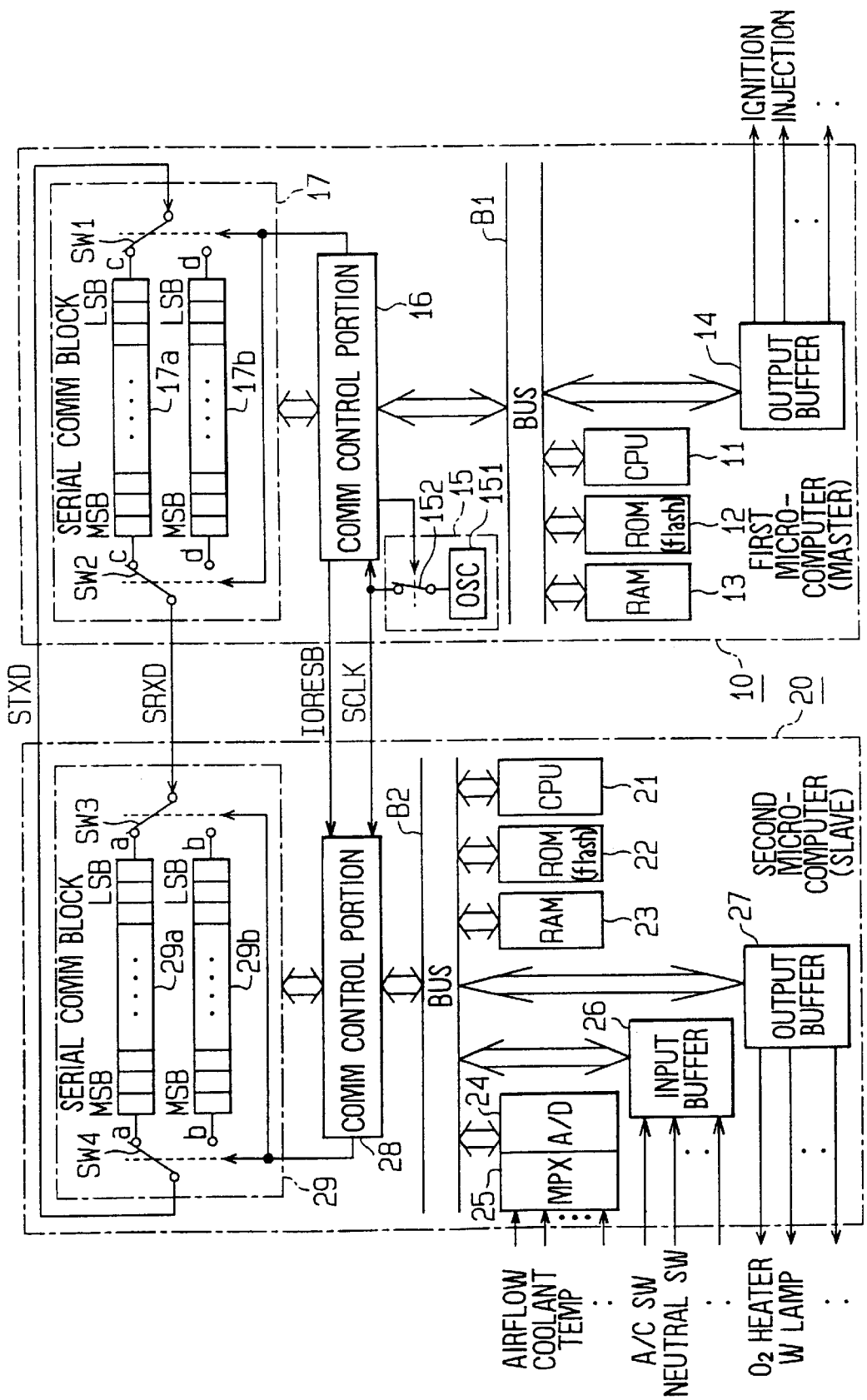
FIG. 1 is a schematic block diagram of an engine ECU of a first embodiment according to the present invention.

A preferable embodiment, in which a serial communication system of the present invention is applied, will be explained with reference to the accompanying drawings.

In a first embodiment, a vehicle electronic control unit (engine ECU), which controls plural types of engine controls, is provided with two microcomputers (serial communication apparatus) each of which having a relationship of a master and a slave therebetween. In the engine ECU, a serial communication is performed through each communication line connected to both microcomputers. At first, the entire structure of the engine ECU of this embodiment will be explained with reference to FIG. 1.

In this serial communication system, a first microcomputer 10 performs an amount of fuel injection control or an ignition timing control of a not-shown engine, and acts as a master microcomputer having an initiative among the serial communication system. A second microcomputer 20 inputs sensing data from plural types of sensors (not-shown) mounted on the engine, and mainly performs supplemental controls such as knock control or load control, and acts as a slave microcomputer. The second microcomputer 20 includes therein an analog-digital (A/D) converter, which performs an analog-digital (A/D) conversion of plural types of sensing data such as airflow and coolant temperature, and performs the A/D conversion in accordance with a request from the first microcomputer 10.

Here, when the second microcomputer 20 performs the knock control, specification data determined every vehicle type is sent from the first microcomputer 10 to the second microcomputer 20, and the second microcomputer 20 performs the knock control based on the sent specification data. In other words, according to the engine ECU of this embodiment, the second microcomputer 20 is commonly used independent of specification. of every vehicle type.

The first microcomputer 10 is provided with: a CPU 11 for calculating the amount of fuel injection or the ignition timing as an amount of control; a ROM 12 for being used as a program memory; a RAM 13 for being used as a data memory; an output buffer 14 for outputting an ignition signal or a fuel injection signal; a clock generating circuit 15; a communication control portion 16; and a serial communication block 17. The CPU 11, the ROM 12, the RAM 13, the output buffer 14 and the communication control portion 16 are connected each other via a common bus B1.

The clock generating circuit 15 includes an oscillator 151 for generating a shift clock SCLK (serial communication clock) having a predetermined cycle for the serial communication, and a switch 152 for being turned on or off by the communication control portion 16. Being turned on by the CPU 11, the communication control portion 16 operates the serial communication block 17, so as to transfer data stored in the ROM 12 or the RAM 13 to the second microcomputer 20, and inputs needed data from the second microcomputer 20.

The serial communication block 17 includes a pair of shift registers 17a and 17b, which are capable of being switched by switches SW1 and SW2. The switches SW1 and SW2 are operated by the communication control portion 16 so that each of the switches SW1 and SW2 is switched one of c-side and d-side in figure, every counting up 16 clocks. The shift registers 17a and 17b are constructed so that when one of them is under the serial communication, the message previously received is analyzed in another of them. Operation of the shift registers 17a and 17b will be explained in detail later.

On the contrary, the second microcomputer 20 includes: a CPU 21 for calculating an amount of control regarding the knock control or the load control; a ROM 22 for being used as a program memory; a RAM 23 for being used as a data memory; an A/D converter 24; a multiplexer 25; an input buffer 26; an output buffer 27; a communication control portion 28; and a serial communication block 29. The CPU 21, the ROM 22, the RAM 23, the A/D converter 24, the input buffer 26, the output buffer 27 and the communication control portion 28 are connected each other via a common bus B2.

Here, plural types of analog signals such as the airflow or coolant temperature are inputted to the analog multiplexer 25. One of the analog signals corresponding to certain channel, which is assigned as an A/D conversion channel by the CPU 21 or the communication control portion 28, is selected by the multiplexer 25, and is A/D converted by the A/D converter 24. Furthermore, the input buffer 26 temporally stores inputs indicating a condition of an A/C (air-conditioner) switch or a condition of a neutral switch. The output buffer 27 temporally stores outputs such as an on/off command for an $O_2$ sensor heater or an on/off command for a warning lamp. That is, each of the buffers 26 and 27 temporally stores a condition of PB (input/output) port.

The communication control portion 28 starts up the A/D converter 24 based on a request command received from the communication control portion 16 of the first microcomputer 10 to have the A/D converter 24 perform the A/D conversion process, returns the processed result, and accesses to memories so as to write data to the RAM 23 or to read data from the RAM 23. In other words, the communication control portion 28 analyzes the request command in the received message and accesses the A/D converter 24 or the RAM 23, when the communication control portion 28 performs a serial data conversion by a so-called handshake based on the shift clock.

The serial communication block 29 has the same structure as that of the serial communication block 17. That is, the serial communication block 29 includes a pair of shift registers 29a and 29b, which are capable of being switched by switches SW3 and SW4. The switches SW3 and SW4 are operated by the communication control portion 28 so that each of the switches SW3 and SW4 is switched one of a-side and b-side in figure, every counting up 16 clocks. The shift registers 29a and 29b are constructed so that when one of them is under the serial communication, the message previously received is analyzed in another of them. Operation of the shift registers 29a and 29b will be explained in detail later.

The first microcomputer 10 is connected to the second microcomputer 20 via a clock line for sending the shift clock, each communication lines for sending a communication synchronously initialize signal IORESB, for a master signal SRXD, and for slave signal STXD. Here, the shift clock SCLK is sent from the clock generating circuit 15 to the communication control portions 16 and 28, and the communication synchronously initialize signal IORESB is sent from the communication control portion 16 to the communication control portion 28. During the communication, the shift clock SCLK is continuously sent at every cycle without being stopped. The communication synchronously initialize signal IORESB is sent every a predetermined cycle (e.g., 4 ms).

Each of the shift registers of the serial communication blocks 17 and 29 is connected in a ring-shape as shown in FIG. 1, so that data in each shift register are exchanged each other based on the shift clock SCLK. Here, the master signal SRXD is sent from the serial communication block 17 to the serial communication block 29, and the slave signal, which is a response for the master signal, is sent from the serial communication block 29 to the serial communication block 17 on the contrary.

In other words, in each of the shift registers, the following shift operations are performed at the same time every 1 clock of the shift clock SCLK.

An MSB of the shift register 17a is transferred to an LSB of the shift register 29a.

An MSB of the shift register 29a is transferred to an LSB of the shift register 17a.

In this case, when the shift clock SCLK is outputted by 16 clocks, 16 bits data (message) stored in each of the shift registers 17a and 29a are completely exchanged.

In the communication control portion 16, the master signal SRXD to be stored in the shift register 17a and 17b of the serial communication block 17 has 16 bits, and includes:

(A) Request command for A/D conversion (A/D conversion request);

(B) Request command for writing data to the RAM 23 (RAM write request); and (C) Request command for reading data from the RAM 23 (RAM read request), as well as data to be communicated normally having 1 byte (8 bits).

Concrete examples of the data communication performed in this system will be described by linking with the request contents of the each command. At the same time, a data structure of the serial data stored in the shift registers 17a and 17b of the first microcomputer 10 (master microcomputer) during the each request shown in FIGS. 2A–2C, and a data structure of the serial data stored in the shift register 29a and 29b of the second microcomputer 20 (slave microcomputer) during the each request shown in FIGS. 2A–2C will be explained with reference to FIGS. 2A–2C.

(A) Request for A/D Conversion

In this embodiment, the first microcomputer 10 itself has no A/D converter as shown in FIG. 1. Therefore, in the case of the amount of the fuel injection control or the ignition timing control, when the first microcomputer 10 needs to input the sensing data regarding, for example, the coolant temperature, the first microcomputer 10 outputs the A/D conversion request to the second microcomputer 20 so that the A/D converted data is transferred to the first microcomputer 10 via the A/D converter 24.

In the case of an A/D conversion request, as shown in FIG. 2A, the master signal SRXD having 16 bits and having the following data structure is sent from the first microcomputer 10 to the second microcomputer 20.

Command for A/D conversion (A/D conversion command);

Assigned channel for A/D conversion (Conversion channel); and

Dummy data

On the contrary, in the case of a response for the A/D conversion request, as shown in FIG. 2B, the slave signal STXD having 16 bits and having the following data structure is returned from the second microcomputer 20.

Assigned channel for A/D conversion (Conversion channel);

Identification (ID) bit F indicating whether the A/D conversion is successfully completed or not; and Result of A/D conversion (A/D conversion result)

(B) Request for Writing Data to the RAM 23

As data to be requested to be written from the first microcomputer 10 to the RAM 23 of the second microcomputer 20, there is knock control data, which is made up of, for example, Map data of corrected value of a knock judgment;

Map data of a fail judgment level; and

Map data in a gate section.

The knock control data is previously registered in the ROM 12 of the first microcomputer 10.

In the case of a RAM data write request, as shown in FIG. 2C, the master signal SRXD having 16 bits and having the following data structure is sent from the first microcomputer 10 to the second microcomputer 20.

Command for writing the RAM 23 (RAM write command);

Address of the RAM 23 to be written (Write address); and

Data of each map data to be written (Write data)

On the contrary, in the case of a response for the RAM write request, as shown in FIG. 2D, the slave signal STXD having 16 bits and having the following data structure is returned from the second microcomputer 20.

Command for writing the RAM 23 (RAM write command);

Address of the RAM 23 to be written (Write address);

Identification (ID) bit F indicating whether the writing of the data is successfully completed or not; and Dummy data (C) Request for Reading Data from the RAM 23

As data to be requested to read the RAM 23 of the second microcomputer 20 by the first microcomputer 10, there is calculated value of, for example, the load condition calculated by the second microcomputer 20.

In the case of a RAM read request, as shown in FIG. 2E, the master signal SRXD having 16 bits and having the following data structure is sent from the first microcomputer 10 to the second microcomputer 20.

Command for reading the RAM 23 (RAM read command);

Address of the RAM 23 to be read (Read address); and

Dummy data

On the contrary, in the case of a response for the RAM read request, as shown in FIG. 2F, the slave signal STXD having 16 bits and having the following data structure is returned from the second microcomputer 20.

Command for reading the RAM 23 (RAM read command);

Address of the RAM 23 to be read (Read address);

Identification (ID) bit F indicating whether the reading of the data is successfully completed or not; and Data read from assigned address in the RAM 23 (Read data)

When the second microcomputer 20 receives unknown command, which is different from the above-mentioned (A), (B) or (C), the second microcomputer 20 regards the command as a wrong command. In this case, as shown in FIG. 2G, the slave signal STXD having 16 bits and having the following data structure is returned from the second microcomputer 20 (here, the Identification (ID) bit F=0).

Request command;

Request address;

Identification (ID) bit F indicating the wrong command; and

Dummy data

Figure 3A:
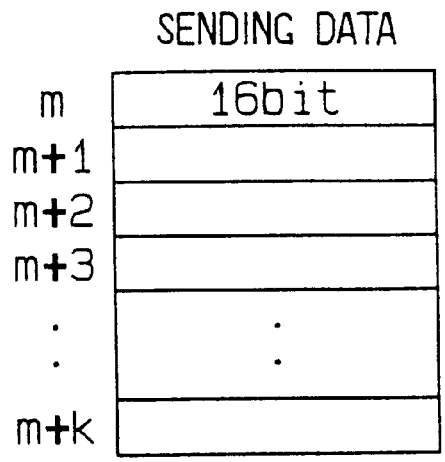
FIGS. 3A and 3B are schematic diagrams illustrating RAM structures of the first embodiment.
Figure 3B:
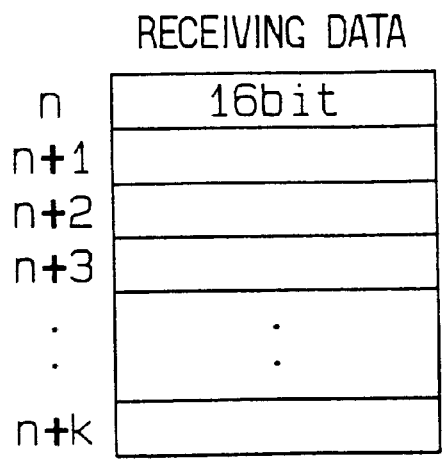

FIGS. 3A and 3B are schematic diagrams illustrating a communication RAM of the first microcomputer 10. As shown in FIG. 3A, the RAM, which stores the sending data, includes a plurality of blocks having 16 bits made up of m to (m+k) blocks. As shown in FIG. 3B, the RAM, which stores the receiving data, includes a plurality of blocks having 16 bits made up of n to (n+k) blocks.

Here, in the apparatus of this embodiment, as described the above, the shift clock SCLK is continuously sent at the predetermined cycle without being stopped during the communication. When it takes long time to perform a process corresponding the command such as the A/D conversion, the apparatus performs a process based on a last command while a next command is being received. Furthermore, the apparatus perform the communication without stopping the shift clock SCLK by performing a full duplex communication.

To realize the apparatus, one of two shift registers in both of the serial communication blocks 17, 29 is used as "a sending register", and another of two registers of the same is used as "a process register"; and are alternately switched every a predetermined clocks between the sending register and the receiving register. In this case, after all of the 16 bits signal (message) are exchanged at the sending register, the received signal corresponding 16 clocks are escaped to the process register, so that the process corresponding to the request command such as the A/D conversion is successively performed without suspending the communication.

In other words, when the serial communication is performed in the one shift register as the sending register (under a communication condition) at the same time, the another register as the process register (under a non-communication condition) analyzes the command received last time so that the predetermined process corresponding to the command is performed. Processed result is stored (registered) in the process register. After waiting for completion of the serial communication corresponding to 16 bits by the sending register, the process register is switched to the sensing register, so that the stored processed result is sent from the sending register. Furthermore, the data of the command, which had received, is temporally escaped to the register, which is not under the communication condition, by the register which received data corresponding 16 clocks being switched to the process register. Therefore, it can prevent the data communication from being suspended every command.

Figure 4:
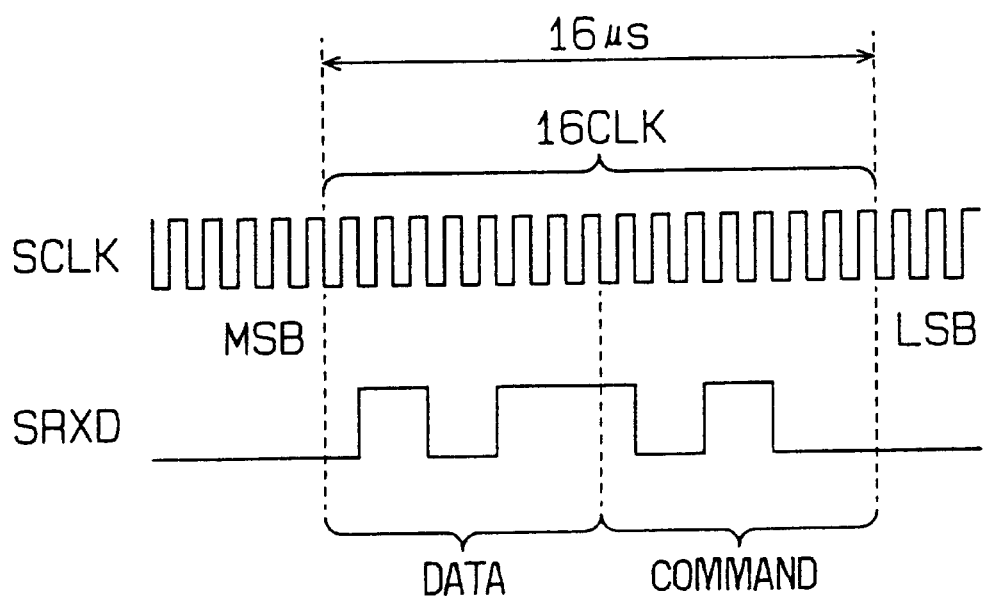
FIG. 4 is a time chart illustrating a basic operation of a data transfer in the first embodiment.

When each of the signals having the above-described data structure is communicated (sent/received) between the first and the second microcomputer 10 and 20, as shown in FIG. 4, signal made up of data portion and command portion, which is defined as a one set corresponding 16 bits of the shift clock SCLK, is sent in synchronization with the shift clock SCLK, which is continuously sent at a cycle of, for example, 1 MHz. In this case, the master signal SRXD having 16 bits is sent from the first microcomputer 10 to the second microcomputer 20 in 16 μs.

Figure 5:
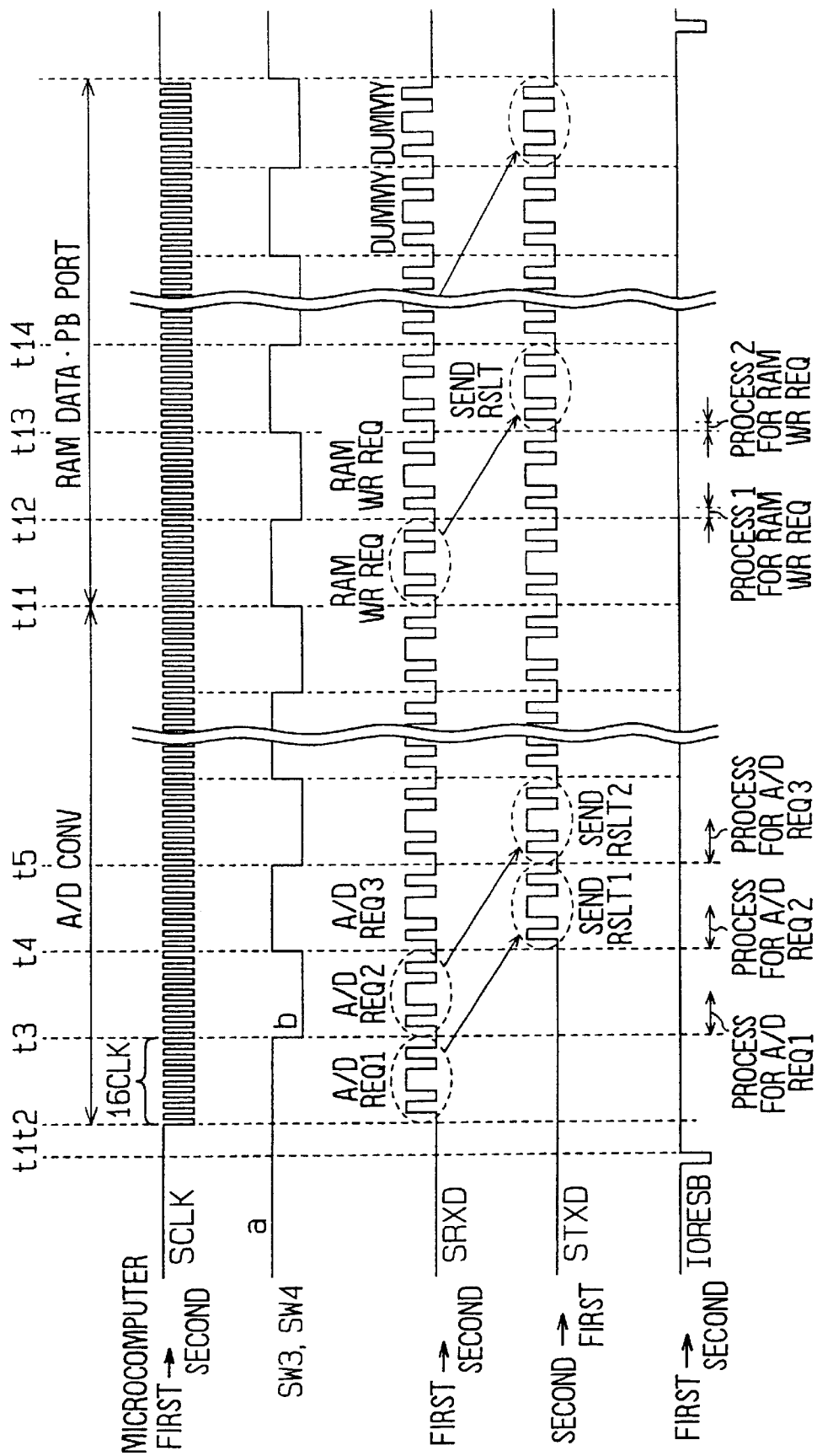
FIG. 5 is a time chart illustrating the data transfer when the processes are requested in the first embodiment.

FIG. 5 is a time chart illustrating conditions of the data transfer when each of the signals having the above structure is communicated (sent/received) between the first and the second microcomputer 10 and 20. FIG. 5 mainly illustrates the operation of the second microcomputer 20. The serial communication of this embodiment will be explained with reference to FIG. 5 hereinafter. Here, in FIG. 5, the A/D converted data is serial-communicated at the first time, and then the RAM data or the PB port data are serial-communicated.

At early stage of starting the communication, the first microcomputer 10 temporally sets the communication synchronously initialize signal IORESB to logically low level (time t1), so that the register of serial communication block is initialized in accordance with the setting. Here, initial values (e.g., 00 . . . 0) are substituted into the shift registers 29*a* and 29*b* in the serial communication block 29. Each of the switches SW3 and SW 4 at MSB side and LSB side of the shift registers 29*a* and 29*b* is connected to the a-side. In this initial condition, the shift register 29*a* becomes the sending register and the shift register 29*b* becomes the process register.

After time t2, the shift clock SCLK having 1 MHz is generated, the first microcomputer 10 sends the master signal SRXD ("AD request 1" in figure) having the command and the data in synchronization with the shift clock SCLK. That is, in this A/D conversion request, the master signal SRXD having the data structure shown in FIG. 2A is sent to the second microcomputer 20. In this case, the sending data from the first microcomputer 10 and the data in the shift register 29*a* are exchanged each other based on the 16 clocks output of the shift clock SCLK. As a result, the shift register 29*a* receives the A/D conversion request command and the assigned channel for the A/D conversion.

When the data communication of the data corresponding to 16 clocks has completed (time t3), the switches SW3 and SW4 are respectively changed to the b-side, so that the shift register 29*a* becomes the process register and that the shift register 29*b* becomes the sending register on the contrary.

After the time t3, similar to the above description, the first microcomputer 10 sends the master signal SRXD ("AD request 2" in figure) having the data structure shown in FIG. 2A in synchronization with the shift clock SCLK. As a result, the shift register 29*b* receives the A/D conversion request command and the assigned channel for the A/D conversion.

The second microcomputer 20 analyzes the process command received by the shift register 29*a* and performs predetermined processed corresponding to the process command (in this case, A/D conversion) in synchronization with the receiving the "AD request 2" at period t3–t4. That is, the second microcomputer 20 performs the predetermined processes corresponding to the request, such that it starts up the A/D converter 24 to A/D convert the assigned channel, and fetches the A/D converted result. After that, the second microcomputer 20 stores (registers) the slave signal STXD having the data structure shown in FIG. 2B into the process register (shift register 29*a*). The second microcomputer 20 waits for the ending of the communication of the sending register (shift register 29*b*). Here, the identification bit F for indicating a judgment result of whether the command is right or not, or whether the process is successfully ended or not, is also registered.

When the data communication of the data corresponding to 16 clocks has completed (time t4), the switches SW3 and SW4 are respectively returned to the a-side again, so that the shift register 29*a* returns the sending register and that the shift register 29*b* returns the process register on the contrary.

At period t4–t5, similar to the above description, the first microcomputer 10 also sends the master signal SRXD ("AD request 3" in figure) having the data structure shown in FIG. 2A in synchronization with the shift clock SCLK. In this case, the second microcomputer 20 receives the A/D conversion request command and the assigned channel for the A/D conversion by using the shift register 29*a*, and sends the slave signal STXD, which has already registered in the register 29*a*, is sent to the first microcomputer 10 instead. In this case, the second microcomputer 20 sends the A/D converted result in accordance with the "AD request 1", the A/D conversion channel and the identification bit F to the first microcomputer 10.

In the first microcomputer 10, after the slave signal STXD is received (after time t5) by the shift register 17*a*, which acts as the sending register at that time, the shift register 17*a* is switched to the process register by operating the switches SW1 and SW2 shown in FIG. 1, so that the data (the above-described A/D converted result) in this process register is stored to own communication RAM.

Afterwards, the above-described processes are repeated until the shift clock SCLK from the first microcomputer 10 is stopped in accordance with ending to the communication.

In short, when the data communication based on the "AD request 1" is considered, the request command from the first microcomputer 10 is read at the first 16 clocks (at period t2–t3); the processes corresponding to the command are performed at the next 16 clocks (at period t3–t4); the processed results corresponding to the command are returned to the first microcomputer 10 at the further next 16 clocks (at period t4–t5).

Here, as shown in FIG. 5, at period t11–t12 and at period t12–t13, the master signal SRXD having the data structure shown in FIG. 2C including the RAM write request command is alternately sent to one of the shift registers 29a and 29b depending on conditions of the switches SW3 and SW4. Furthermore, at period t12–t13, the RAM write process is performed in response to the RAM write request command in the SRXD signal received immediately before (i.e., at period t11–t12), and the slave signal STXD having the data structure shown in FIG. 2D is registered in the process register at that timing. Furthermore, at the following period (i.e., at period t13–t14), the slave signal STXD including the processed result of the RAM write request is sent to the first microcomputer 10 bartering new sending data from the first microcomputer 10.

After ending a series of the communication process, finally, two dummy data are sent from the first microcomputer 10. Therefore, the second microcomputer 20 sends the final processed data of the shift registers 29a and 29b to the first microcomputer 10 by bartering the dummy data.

The communication synchronously initialize signal IORESB is controlled to logically low level every, for example, 4 ms on purpose to periodically synchronize the communication between the first and the second microcomputer 10, 20. In this way, a basic timing is periodically adjusted and it can prevent clock signal from drifting due to noise or the like.

Next, the communication process performed by using the first and the second microcomputer 10, 20 will be explained in detail with reference to flowcharts shown in FIGS. 6–9. It should be noted that, actually, equivalent processes of the following processes are realized by logical operations by using hardware.

Figure 6:
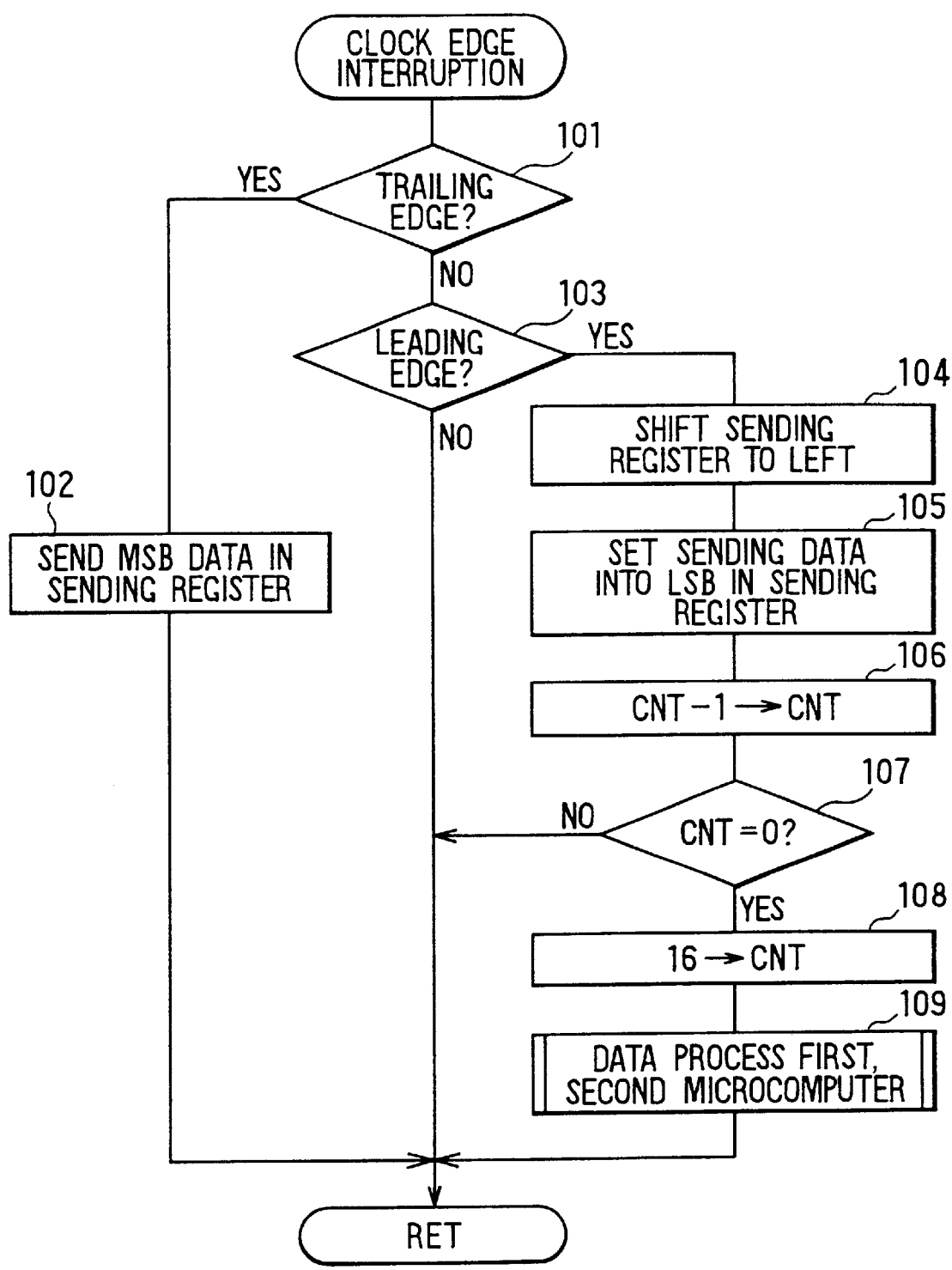
FIG. 6 is a flowchart illustrating a clock edge interruption process of the first embodiment.

FIG. 6 is a flowchart illustrating a clock edge interruption process, which is to be executed by each of the communication control portions 16 and 28. In this process shown in FIG. 6, each of the communication control portions 16, 28 always observes an existence of message received from opposite side microcomputer 20, 10 based on a condition of the shift clock SCLK. When the received message arrives, the communication control portion 16 (28) analyzes the request command included the received message, and performs the process corresponding to each request based on the analyzed command.

In detail, at step 101, the communication control portion 16 (28) judges whether this interruption is derived from a trailing edge of the shift clock SCLK or not. When the judgment is YES, the communication control portion 16 (28) moves to step 102 to send the MSB data of the sending register from a sensing terminal. After that, this process is terminated for a while.

When the judgment is NO at step 101, the communication control portion 16 (28) moves to step 103, and judges whether this interruption is derived from a leading edge of the shift clock SCLK or not. When the judgment is YES, the communication control portion 16 (28) moves to step 104, and shifts the sending register to an upper bit side (left side in FIG. 1). After that, at step 105, the communication control portion 16 (28) registers the data received from the opposite side microcomputer into the LSB of the sending register. At the following step 106, the communication control portion 16 (28) decreases a clock counter at this time by "1".

At step 107, the communication control portion 16 (28) judges whether the clock counter is "0" or not, and terminates this process when the judgment is NO (≠0). In other words, when the clock counter≠0, as described the above, the communication control portion 16(28) repeatedly performs the following steps.

Sending the MSB data in the sending register (step 102); and

Registering the received data to the LSB of the sending register (step 105)

Figure 7:
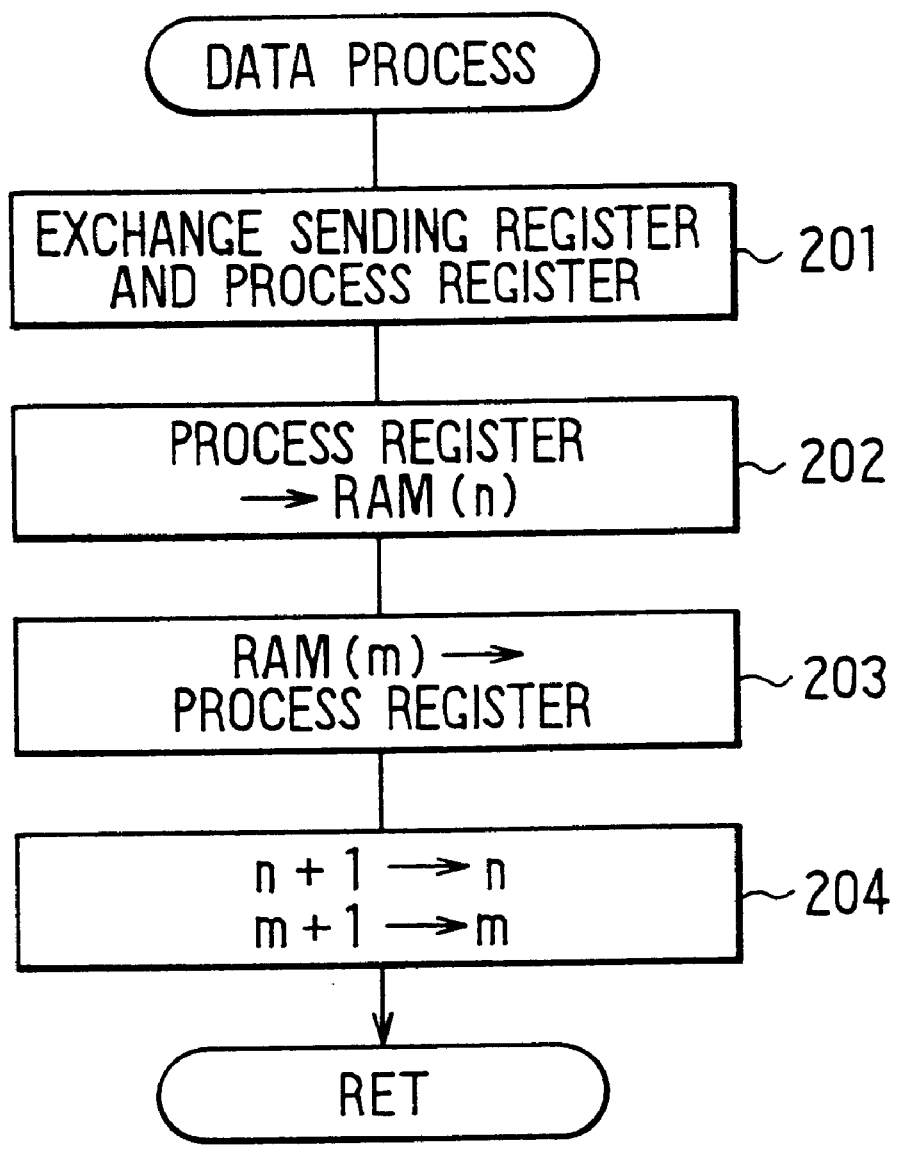
FIG. 7 is a flowchart illustrating a data process executed by a first microcomputer in the first embodiment.
Figure 8:
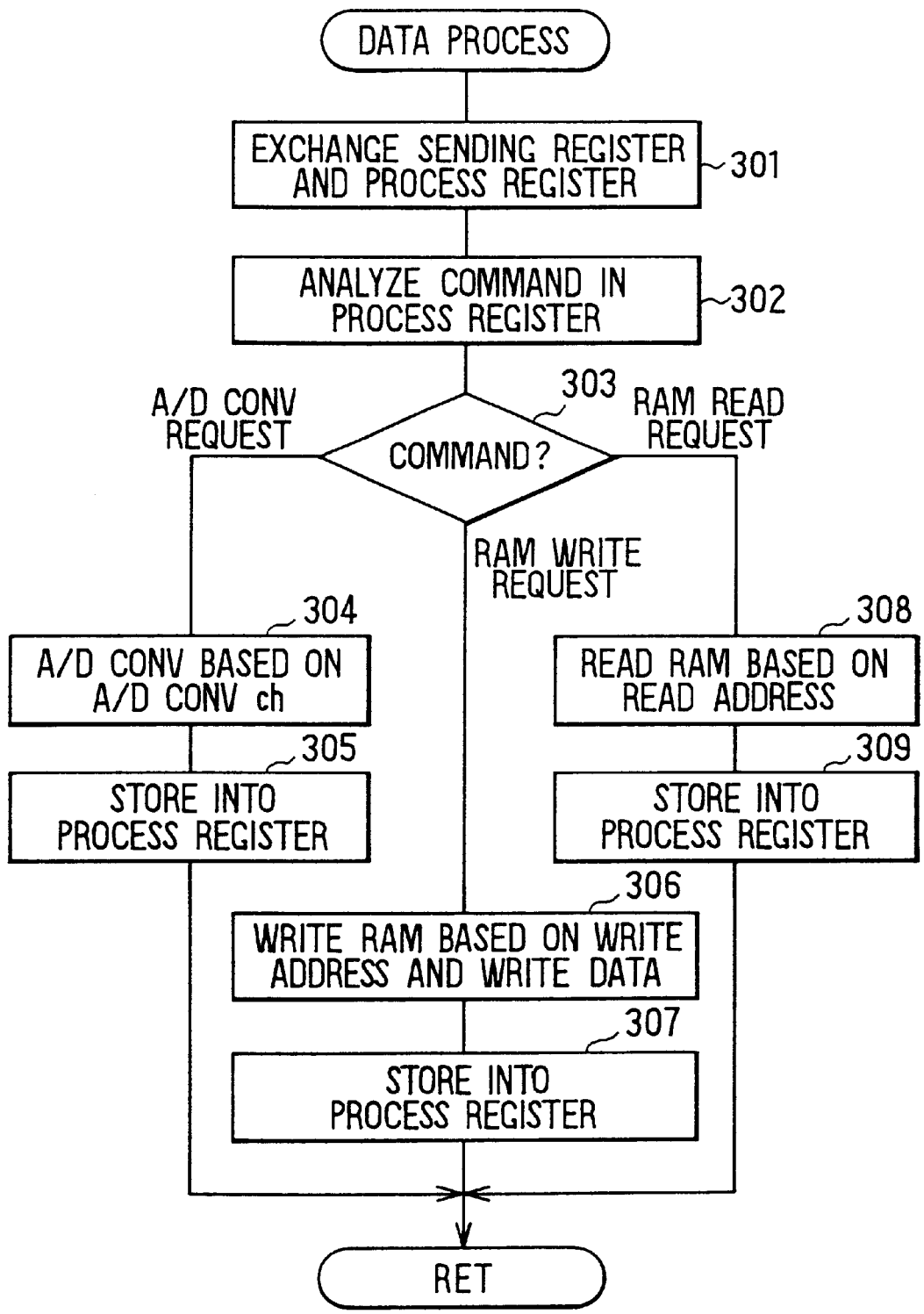
FIG. 8 is a flowchart illustrating a data process executed by a second microcomputer in the first embodiment.

When step 107 becomes YES in accordance with the ending of the data communication (receiving and sending) corresponding 16 clocks, the communication control portion 16 (28) moves to step 108, and sets the clock counter to "16". After that, at step 109, data process individually executed by the first and the second microcomputer 10, 20 is executed. Here, the data process as shown in FIG. 7 is executed in the first microcomputer 10, and the data process as shown in FIG. 8 is executed in the second microcomputer 20. After executing the data process, this process is terminated for a while.

In the data process shown in FIG. 7, which is executed by the first microcomputer 10, at step 201, the first microcomputer 10 exchanges the sending register and the process register by operating the switches SW1 and SW2 in the serial communication block 17. Here, for example, when the communication by the shift register 17a is ended, this shift register 17a is switched to the process register, and the shift register 17b is switched to the sending register.

After that, the first microcomputer 10 stores the contents in the process register into the n-block of the communication RAM at step 202, and writes the contents in the m-block of the communication RAM into the process register at step 203. Furthermore, at step 204, the first microcomputer 10 sets the block of the communication RAM to (n+1) and (m+1), and terminates this process.

Next, the data process executed by the second microcomputer 20 will be explained with reference to the flowchart shown in FIG. 8.

At step 301, the first microcomputer 20 exchanges the sending register and the process register by operating switches SW3 and SW4 in the serial communication block 29. Here, for example, when the communication by the shift register 29a is ended, this shift register 29a is switched to the process register, and the shift register 29b is switched to the sending register.

After that, the second microcomputer 20 analyzes the command in the process register at step 302, and judges the contents of the command at step 303. Here, the second microcomputer 20 judges whether the command in the process register is one of the following commands.

(A) Request command for A/D conversion (A/D conversion request);

(B) Request command for writing data to the RAM 23 (RAM write request); and (C) Request command for reading data from the RAM 23 (RAM read request)

Furthermore, the second microcomputer 20 performs the process corresponding to the each command.

In other words, when the analyzed command is (A), the second microcomputer 20 moves to step 304. At step 304, the second microcomputer 20 selects the A/D conversion channel (ch), which is assigned by the data in the process register, and starts up the A/D converter 24. At the following step 305, the second microcomputer 20 registers the A/D conversion channel (ch), the A/D converted result and the identification bit F into the process register, and terminates this process for a while.

When the analyzed command is (B), the second microcomputer 20 moves to step 306. At step 306, the second microcomputer 20 performs writing to the RAM 23 based on the write address and the write data contained in data in the process register. At the following step 307, the second microcomputer 20 registers the write address and the identification bit F into the process register, and terminates this process for a while.

Furthermore, when the analyzed command is (C), the second microcomputer 20 moves to step 308. At step 308, the second microcomputer 20 reads data from the RAM 23 based on the read address contained in data in the process register. At the following step 309, the second microcomputer 20 registers the read address, the read data and the identification bit F into the process register, and terminates this process for a while.

Figure 9:
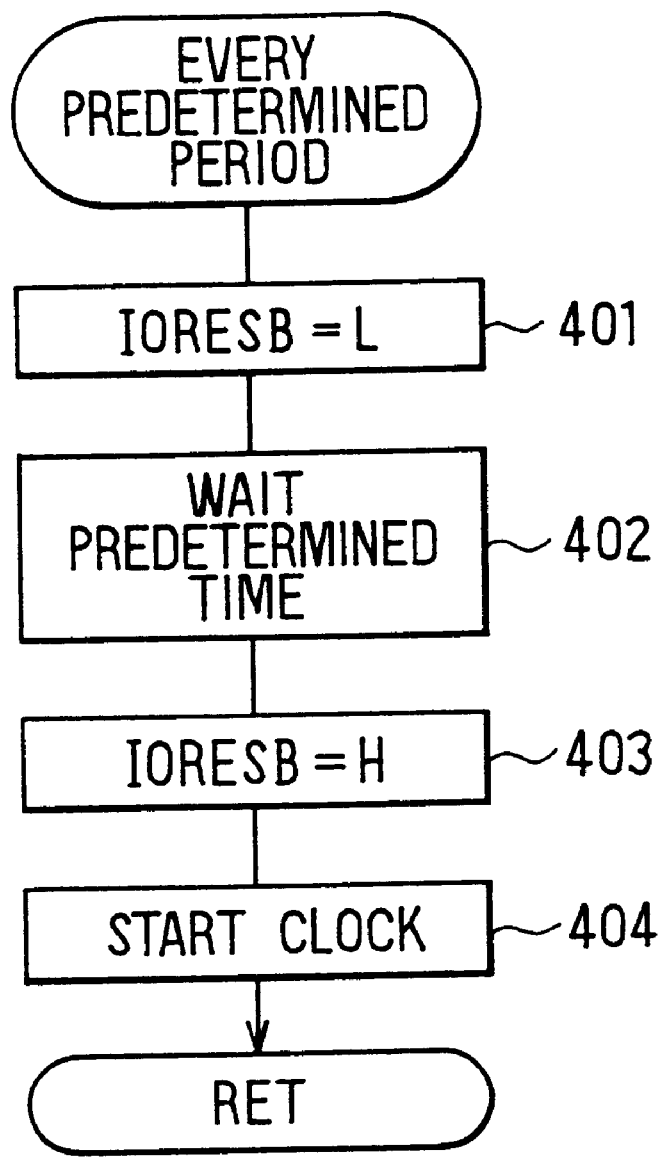
FIG. 9 is a flowchart illustrating an interruption process executed by the first microcomputer every a predetermined interval in the first embodiment.

FIG. 9 is a flowchart illustrating an interruption process executed by the first microcomputer 10 every a predetermined period (e.g., every 4 ms). According to this process, the communication performed by each microcomputer is synchronized.

The first microcomputer 10 sets the communication synchronously initialize signal IORESB to logically low level at step 401, and waits for (holds) a predetermined time (e.g., 10 $\mu$s) with keeping this situation at the following step 402. After that, the first microcomputer 10 returns the communication synchronously initialize signal IORESB to logically high level at step 403, starts up the shift clock SCLK at step 404, and terminates this process for a while.

According to this embodiment, the following results can be achieved.

(a) In the serial communication, in which a receiving of a process command and a sending of a processed result corresponding to the process command are performed in synchronization with a shift clock SCLK, a communication speed can be improved because a clock is not stopped and because the communication is not suspended due to the stop of the clock. In other words, when the process corresponding to the process command is, for example, an A/D conversion, and when it takes long time to complete the process, it does not need to stop the communication every command. Hence the communication speed can be improved. In this case, when it is compared per a constant communication time, the serial communication system of this embodiment enables mass data transfer compared to the conventional system.

(b) Since a pair of shift registers, which are alternately switched between a communication condition and a non-communication condition, are employed, the process command immediately after receiving can be temporally escaped, and a predetermined process corresponding to the process command can be performed at the shift register at which the process command is escaped. Therefore, for example, when the process corresponding to the process command is, for example, an A/D conversion, and when it takes long time to complete the process, it does not need to stop the communication every command. Hence the communication speed can be improved.

(c) According to the above-described structure, it is not essential to ascertain whether a preparation of the communication has completed or not every communication corresponding 16 clocks. Therefore, it does not need to provide a slave response communication line (e.g., the EOCT line in JP A 9-282265), so that the structure can be simplified.

(d) since the communication synchronously initialize signal IORESB is received at a predetermined cycle, it can prevent clock signal from drifting due to noise or the like, even if such a drift is temporally occurred. That is, the communication is repeatedly synchronized, so that accurate serial communication can be continued.

Next, a second to a fifth embodiment of the present invention will be explained. In the drawings, same portions or corresponding portions as those of the first embodiment are put the same numerals with the first embodiment to eliminate redundant explanation. Differences between the first embodiment will be mainly explained hereinafter.

Second Embodiment

A second embodiment relates to a serial communication apparatus, in which a communication can be continued without being interrupted, even if a process time for performing processes corresponding to the request command by the slave microcomputer becomes longer than the predetermined time made up of a predetermined numbers of clock. In other words, the serial communication apparatus of the second embodiment can perform the serial communication even when one of the following cases.

In the case where a plural of A/D conversion is continuously performed in accordance with a continuous A/D conversion request;

In the case where A/D conversion time (20 $\mu$s)>16 clocks time (16 $\mu$s); and In the case where the A/D conversion process is waited because one A/D converter is shared by plural apparatuses Here, it is assumed that the continuous A/D conversion request is arrived, and that the continuous A/D conversion is independently performed from the communication when the request is arrived. That is, there is communication of the RAM data (adapted value of the knock control) other than the A/D conversion data in the communication between the first and second microcomputer 10, 20. Therefore, the continuous A/D conversion is performed at background, which is independent of the communication, by effectively using the communication time of the RAM data.

In the case where the continuous A/D conversion is performed, the master signal sent from the first microcomputer 10 includes the following commands.

Request command for continuous A/D conversion; and

Request command for fetching result of the continuous A/D conversion (continuous A/D conversion result fetch command)

In detail, when the A/D conversion request is outputted from the first microcomputer 10 to the second microcomputer 20, the master signal SRXD having 16 bits and having the following data structure as shown in FIG. 10A is sent.

Request command for continuous A/D conversion;

Assigned channel from which the A/D conversion starts (A/D conversion start channel);

The number of the assigned channel of the A/D conversion (the number of A/D conversion channel); and Dummy data Furthermore, for replying the request for fetching the A/D conversion result after completing the continuous A/D conversion process, the master signal SRXD having 16 bits and having the following data structure as shown in FIG. 10B is sent from the first microcomputer 10.

Request command for fetching result of the continuous A/D conversion (continuous A/D conversion result fetch command);
Channel from which the continuous A/D conversion result is to be fetched (fetch channel); and
Dummy data On the contrary, as shown in FIG. 10C, the slave signal STXD having 16 bits and having the following data structure is returned from the second microcomputer 20, which received the master signal SRXD.

Figure 11:
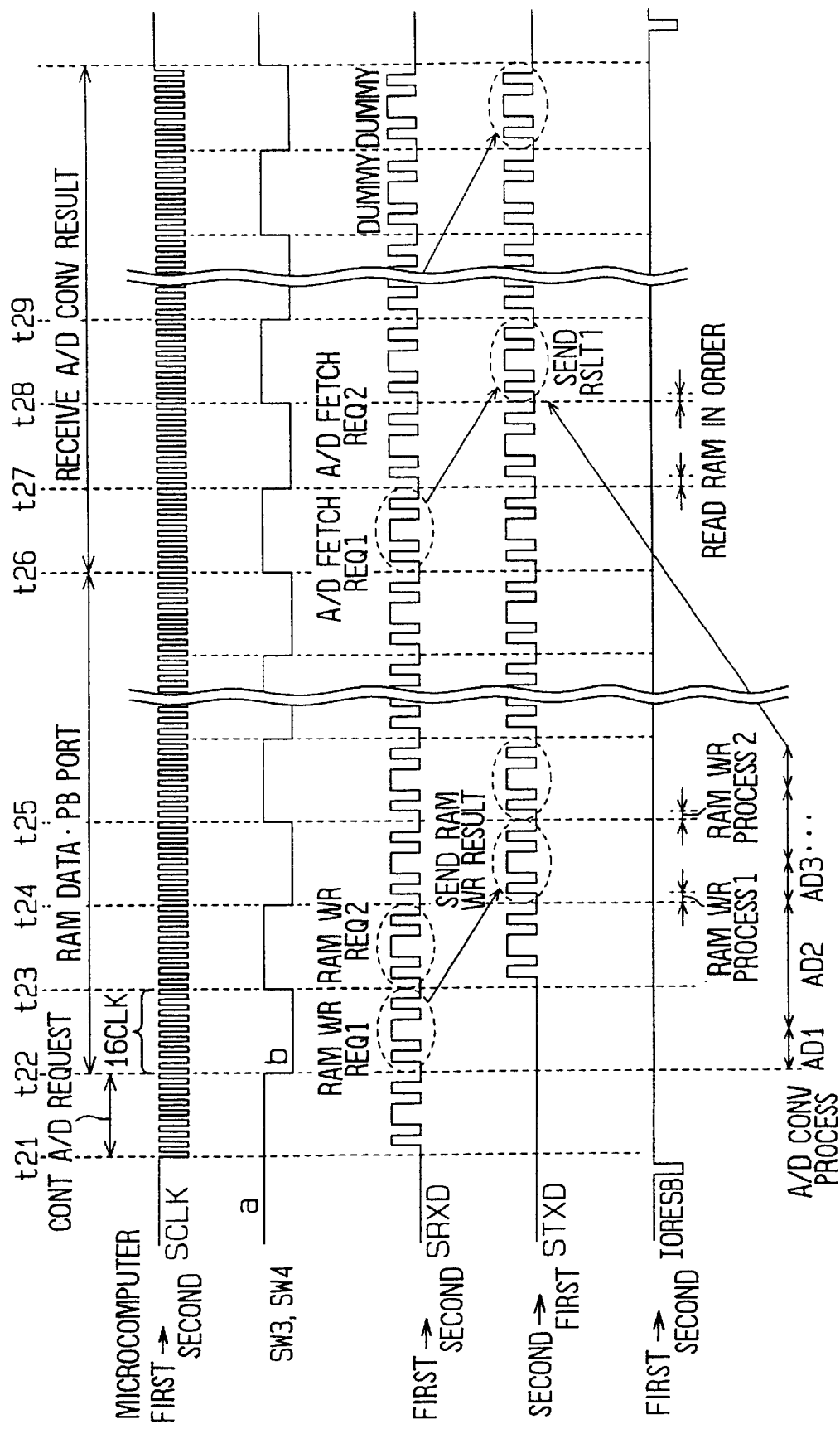
FIG. 11 is a time chart illustrating the data transfer when the processes are requested in a second embodiment according to the present invention.

Channel from which the continuous A/D conversion result is fetched (fetch channel);
Identification (ID) bit F indicating whether the continuous A/D conversion successfully completed or not; and
continuous A/D conversion result FIG. 11 is a time chart illustrating conditions of the data transfer when each of the signals having the above structure is communicated (sent/received) between the first and the second microcomputer 10, 20. FIG. 11 mainly illustrates the operation of the second microcomputer 20. Differences between FIG. 5 will be mainly explained.

After resetting the communication synchronously initialize signal IORESB, at period t21–t22, the first microcomputer 10 sends the master signal SRXD, which has the data structure shown in FIG. 10A and includes the continuous A/D conversion request command, in synchronization with the shift clock SCLK. For example, the first microcomputer 10 sends a command that "perform A/D conversion from ch1 to ch4".

In this time, the sending data from the first microcomputer 10 and the data in the shift register 29a (sending register) are exchanged each other, so that the shift register 29a receives:

Request command for continuous A/D conversion;
Assigned channel from which the A/D conversion starts; and
The number of the assigned channel of the A/D conversion.

When the data communication of the data corresponding to 16 clocks has completed (time t22), the switches SW3 and SW4 are respectively changed from the a-side to the b-side, so that the shift register 29a becomes the process register and that the shift register 29b becomes the sending register on the contrary.

Here, at period t22–t23 and at period t23–t24, the master signal SRXD having the data structure shown in FIG. 2C including the RAM write request command is alternately sent to one of the shift registers 29a and 29b depending on conditions of the switches SW3 and SW4. Furthermore, at period t23–t24, the RAM write process is performed in response to the RAM write request command in the SRXD signal received immediately before (i.e., at period t22–t23), and the slave signal STXD having the data structure shown in FIG. 2D is registered in the process register at that timing. Furthermore, at the following period (i.e., at period t24–t25), the slave signal STXD including the processed result of the RAM write request is sent to the first microcomputer 10 for bartering new sending data from the first microcomputer 10.

After time t22, at the background independent of the communication, the second microcomputer 20 performs the continuous A/D conversion process such that "AD1, AD2, AD3, . . .", based on both the assigned channel from which the A/D conversion starts and the number of the assigned channel of the A/D conversion, which are included in the master signal SRXD received at period t21–t22. After that, the second microcomputer 20 stores the A/D conversion result into the RAM 23 one by one.

After a series of the communication in reply to the RAM write request or the like has completed, the first microcomputer 10 fetches the continuous A/D conversion result. That is, at period t26–t27, the first microcomputer 10 sends the master signal SRXD (A/D conversion result fetch request 1, or "A/D fetch request 1" in FIG. 11), which has the data structure shown in FIG. 10B and includes the continuous A/D conversion result fetch command, to the second microcomputer 20 in synchronization with the shift clock SCLK. In this time, the sending data from the first microcomputer 10 and the data in the shift register 29a (sending register) are exchanged each other, so that the shift register 29a receives:

Request command for fetching result of the continuous A/D conversion (continuous A/D conversion result fetch command); and
Channel from which the continuous A/D conversion result is to be fetched (fetch channel).

After that, at time t27, the sending register and the process register are switched each other. Furthermore, at period t27–t28, the first microcomputer 10 sends the master signal SRXD (A/D conversion result fetch request 2, or "A/D fetch request 2" in FIG. 11), which has the data structure shown in FIG. 10B and includes the continuous A/D conversion result fetch command, to the second microcomputer 20 in synchronization with the shift clock SCLK, as well as at period t27–t28. In this time, the sending data from the first microcomputer 10 and the data in the shift register 29b (sending register) are exchanged each other, so that the shift register 29b receives:

Request command for fetching result of the continuous A/D conversion (continuous A/D conversion result fetch command); and
Channel from which the continuous A/D conversion result is to be fetched (fetch channel).

On receiving the "A/D fetch request 2" at period t27–t28, the microcomputer 20 fetches the A/D conversion result based on the process command received at period t26–t27. In other words, the second microcomputer 20 reads the continuous A/D conversion result stored in the RAM 23, and registers the read result into the process register (shift register 29a) as the slave signal STXD having the data structure shown in FIG. 10B. After that, the second microcomputer 20 waits for ending of the communication of the sensing register (shift register 29b).

At time t28, the sending register and the process register are switched again. Furthermore, at period t28–t29, the second microcomputer 20 sends the slave signal STXD stored in the sending register (shift register 29a) to the first microcomputer 10. That is, the continuous A/D conversion result and so on are sent to the first microcomputer 10. After receiving the slave signal STXD, the first microcomputer 10 stores the continuous A/D conversion result into the own communication RAM.

Figure 12:
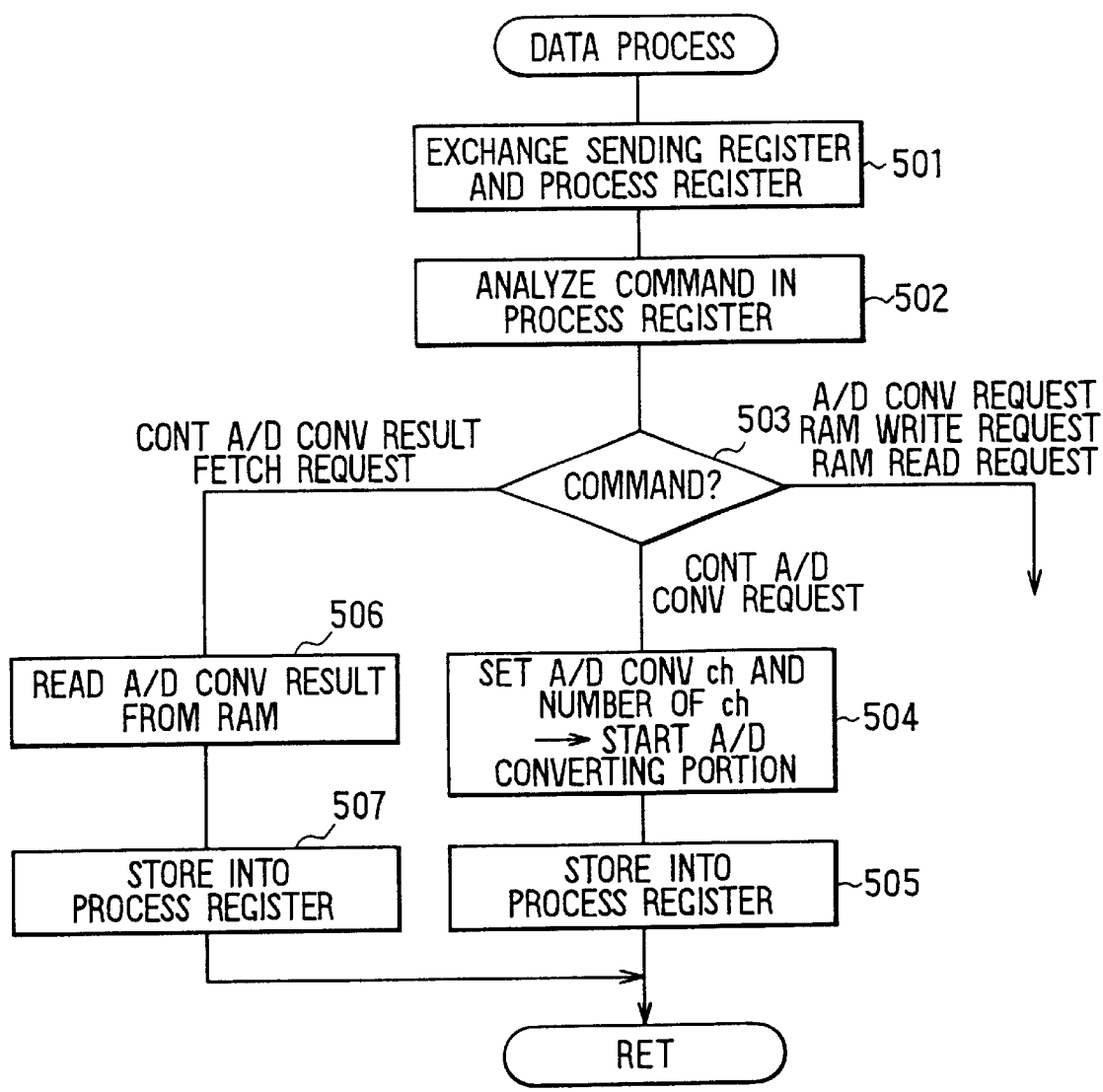
FIG. 12 is a flowchart illustrating a data process executed by a second microcomputer in the second embodiment.

Next, data process executed by the second microcomputer 20 will be explained with reference to a flowchart shown in FIG. 12. The data process is executed by being replaced with the data process in FIG. 8, for example.

At step 501, the first microcomputer 20 exchanges the sending register and the process register by operating the switches SW3 and SW4 in the serial communication block 29 (alike the step 301 in FIG. 8). After that, the second microcomputer 20 analyzes the command in the process register at step 502, and judges the contents of the command at step 503. Here, the second microcomputer 20 judges whether the command in the process register is one of the following commands.

(A) Request command for A/D conversion (A/D conversion request);

(B) Request command for writing data to the RAM 23 (RAM write request);

(C) Request command for reading data from the RAM 23 (RAM read request);

(C) Request command for continuous A/D conversion (continuous A/D conversion request); and (D) Request command for fetching the result of the continuous A/D conversion (continuous A/D conversion result fetch command)

Furthermore, the second microcomputer 20 performs the process corresponding to the each command.

In other words, when the analyzed command is (D), the second microcomputer 20 moves to step 504. At step 504, the second microcomputer 20 sets the assigned channel (ch) from which the A/D conversion starts and the number of the assigned channel, which are assigned by the data in the process register, and starts up the A/D converter 24 one by one. At the following step 505, the second microcomputer 20 registers the assigned channel (ch) from which the A/D conversion starts, the number of the assigned channel and the identification bit F into the process register, and terminates this process for a while.

When the analyzed command is (E), the second microcomputer 20 moves to step 506. At step 506, the second microcomputer 20 reads the A/D conversion result from the RAM 23 in accordance with the channel, from which the continuous A/D conversion result is to be fetched. After that, at step 507, the second microcomputer 20 registers the channel from which the continuous A/D conversion result is to be fetched, the continuous A/D conversion result and the identification bit F into the process register, and terminates this process for a while.

According to the second embodiment, when it takes long time to perform the A/D conversion in response to the continuous A/D conversion request, the other command from the first microcomputer 10 can be performed by using time of. the A/D conversion, without suspending the communication. Therefore, it can improve communication efficiency and can facilitate the communication.

Third Embodiment

In the serial communication system between plural microcomputers, when the shift clock is drifted even by one clock, the command to be sent becomes the wrong command or the command for performing different process. Therefore, a serial communication system of this embodiment forcefully suspends the communication, when the wrong command, which is not defined, is received even one time, so that it prevents wrong processes from being performed.

Figure 13:
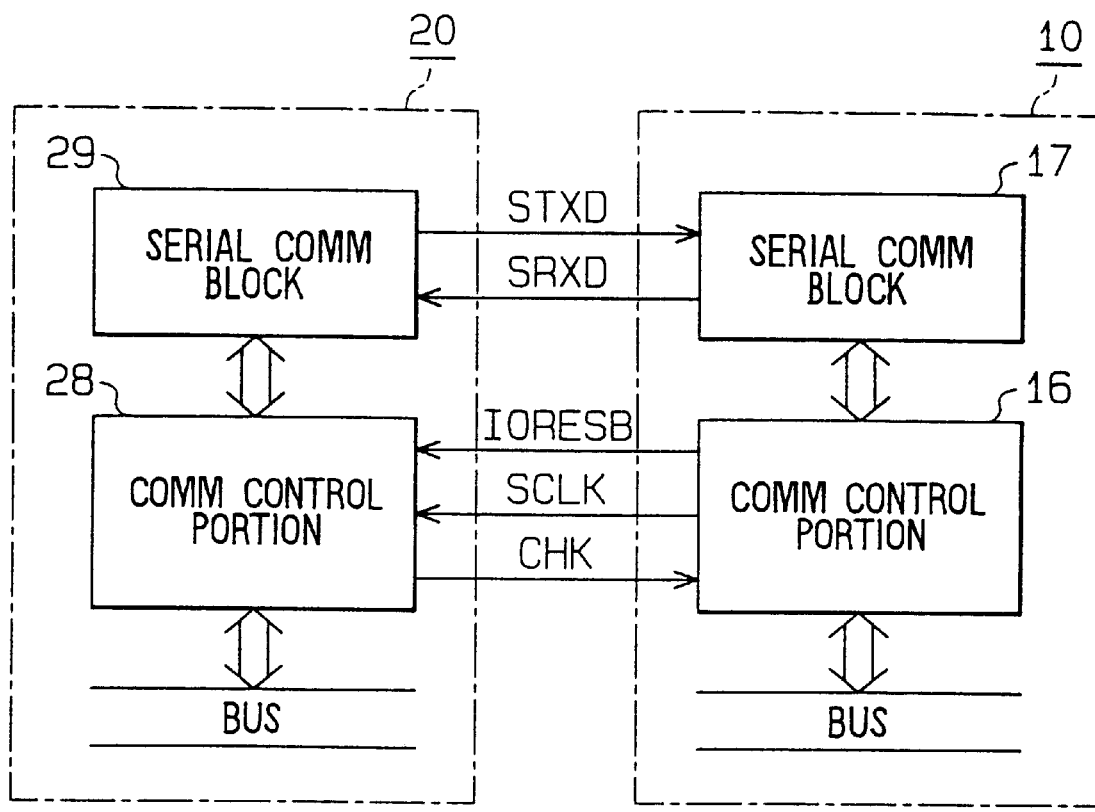
FIG. 13 is a schematic block diagram illustrating structures of each of the first and the second microcomputer of the second embodiment.

FIG. 13 is a schematic block diagram illustrating a structure of the engine ECU of this embodiment. As differences between FIG. 1, the second microcomputer 20 sends a check signal CHK to the first microcomputer 10. The check signal CHK is for forcefully suspending the communication, after the second microcomputer 20 receives the wrong command or the like.

Figure 14:
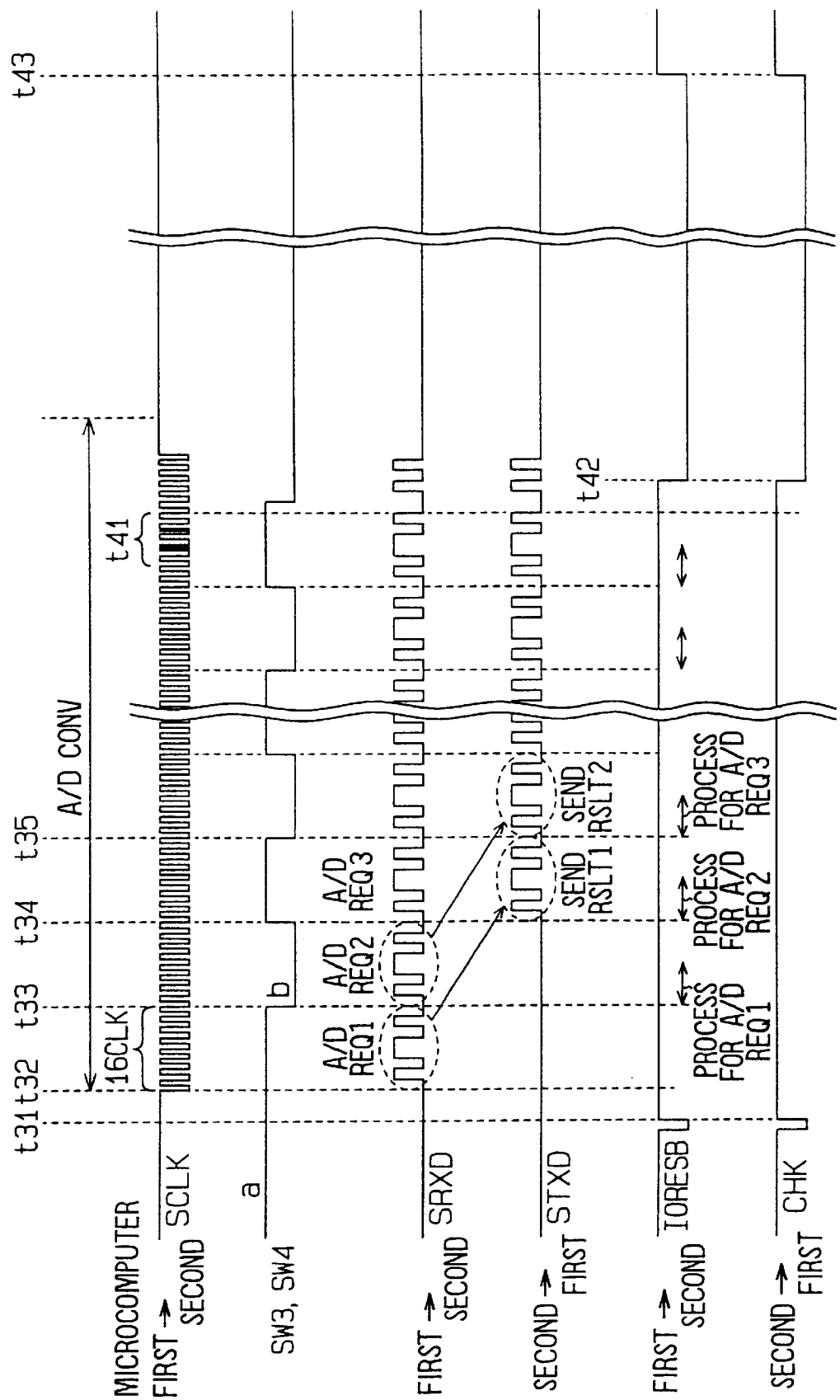
FIG. 14 is a time chart illustrating the data transfer when the processes are requested in a third embodiment according to the present invention.

FIG. 14 is a time chart illustrating conditions of the data transfer when each of the signals is communicated (sent/received) between the first and the second microcomputer 10 and 20. FIG. 14 mainly illustrates the operation of the second microcomputer 20. Differences between FIG. 5 will be mainly explained.

At time t31, the check signal CHK is reset in accordance with a reset of the communication synchronously initialize signal IORESB. The first microcomputer 10 can ascertains whether each communication line for each signal is broken (disconnected) by resetting the communication synchronously initialize signal IORESB and the check signal CHK.

Each of the periods t32–t33, t33–t34 and t34–t35, the first microcomputer 10 continuously sends the master signal SRXD ("A/D request 1, 2, 3" in FIG. 14) including the A/D conversion request command in synchronization with the shift clock SCLK, which is generated every 1 MHz. Furthermore, the sending register and the process register are switched every 16 clocks. The second microcomputer 20 receives the A/D conversion request command by using the sending register, which is switched to the sending register at that time. The second microcomputer 20 registers the processed result (A/D conversion result or the like) corresponding to the request command into the process register, when the sending register is switched to the process register. When the process register is returned to the sending register, the second microcomputer 20 sends the processed result to the first microcomputer 10.

After that, at time t41, when the shift clock SCLK is drifted by some clocks due to noise or the like, the second microcomputer 20 recognizes that received command is a wrong command (time t42). At the time t42, the second microcomputer 20 sets the check signal to logically low level. The first microcomputer 10 forcefully suspends the serial communication and sets the communication synchronously initialize signal IORESB to logically low level in synchronization with a trailing edge of the check signal CHK.

After that, at time t43, the first microcomputer 10 raises the communication synchronously initialize signal IORESB from logically low level to logically high level. As a result, the check signal CHK is also returned to logically high level.

Figure 15:
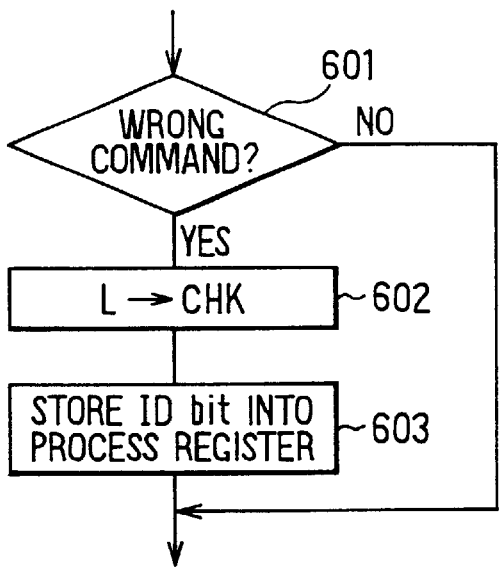
FIG. 15 is a flowchart illustrating a data process executed by a second microcomputer in the third embodiment.

Next, one part of the data process to be executed by the second microcomputer 20 will be explained with reference to FIG. 15. This process is executed, for example, immediately after the step 302 in FIG. 8 (or immediately after the step 502 in FIG. 12).

At step 601, the second microcomputer 20 judges whether the received command is a wrong command or not. When the step 601 is NO, the second microcomputer 20 moves to not-shown succeeding processes (step 303 in FIG. 8 or step 503 in FIG. 12). Furthermore, when the received command is the wrong command, the second microcomputer 20 moves step 602, and sets the check signal SCK to logically low level. At the following step 603, the second microcomputer 20 registers the identification bit indicating the occurrence of abnormality into the process register.

Figure 16:
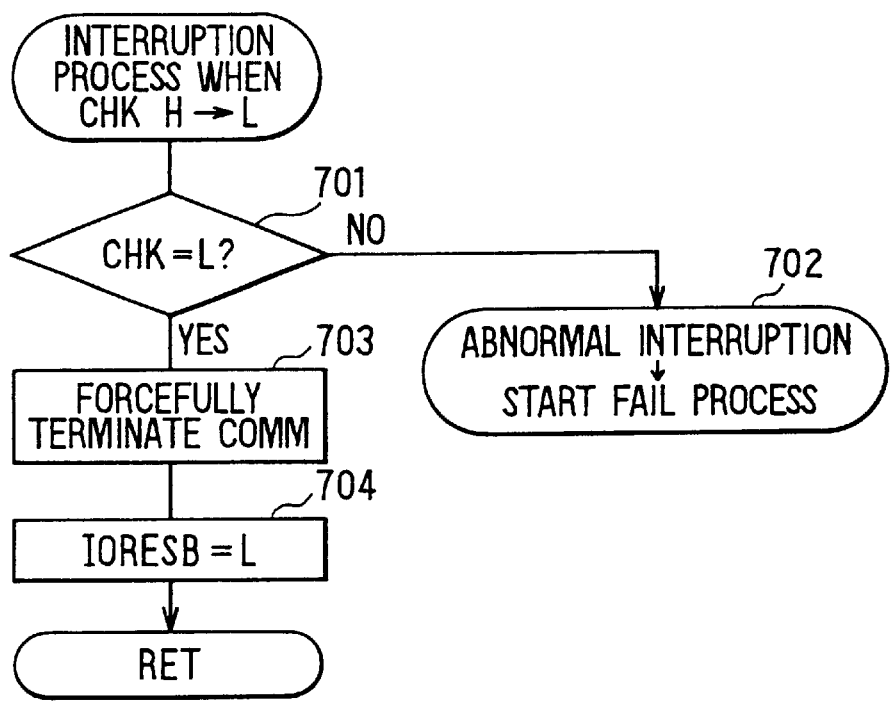
FIG. 16 is a flowchart illustrating an interruption process when a check signal rises in the third embodiment.

The first microcomputer 10 initializes an interruption process shown in FIG. 16 in accordance with a falling of the check signal CHK. In detail, as shown in FIG. 16, the first microcomputer 10 judges whether the check signal CHK at that timing is logically low level or not at step 701. When the CHK=H, since it means the first microcomputer 10 misunderstands that this timing is falling timing of the check signal CHK, the first microcomputer 10 moves to step 702 to judges an occurrence of the abnormal interruption, and executes a predetermined failsafe process.

On the contrary, when the CHK=L, the first microcomputer 10 moves to step 703, and forcefully terminates the communication. At the following step 704, the first microcomputer 10 rises the communication synchronously initialize signal IORESB to logically low level, and terminates this process.

Figure 17:
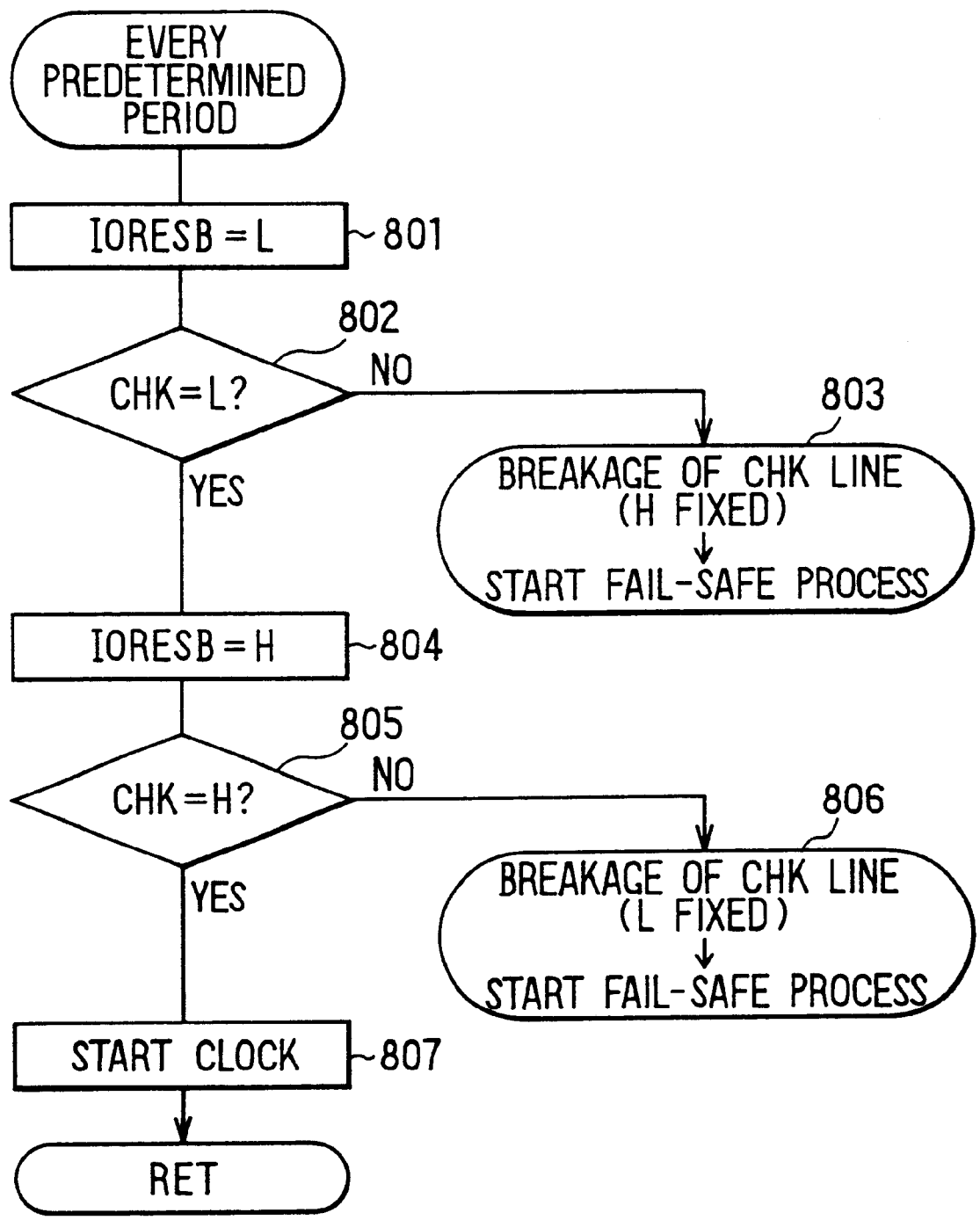
FIG. 17 is a flowchart illustrating a interruption process executed every a predetermined interval in the third embodiment.

On the contrary, the first microcomputer 10 initializes a process shown in FIG. 17 every a predetermined period (e.g., every 4 ms). This process is executed by being replaced with the process in FIG. 9, for example. As shown in FIG. 17, the first microcomputer sets the communication synchronously initialize signal IORESB to logically low level at step 801, and judges whether the check signal CHK sent from the second microcomputer 20 is logically low level or not at step 802. Normally, the CHK=L in accordance with IORESB=L. Therefore, when the step 802 is NO (CHK=H), the first microcomputer 10 moves to step 803, and executes the failsafe process for this abnormality by regarding a breakage of the check line (H-fixed).

Furthermore, when the step 802 is YES (CHK=L), the first microcomputer 10 moves to step 804 to return the communication synchronously initialize signal IORESB to logically high level. At the following step 805, the first microcomputer 10 judges whether the check signal CHK sent from the second microcomputer 20 is logically high level or not. Normally, the CHK=H in accordance with IORESB=H. Therefore, when the step 802 is NO (CHK=L), the first microcomputer 10 moves to step 806, and executes the failsafe process for this abnormality by regarding a breakage of the check line (L-fixed).

When the step 805 is YES (CHK=L), the first microcomputer 10 moves to step 807 to start up the shift clock SCLK, and terminates this process for a while. According to this process shown in FIG. 15, the clock can be periodically restarted.

According to this embodiment, it can prevent an inconvenience, in which the communication becomes abnormal condition due to the shift of the clock or the like and wrong process is performed, from occurrence in advance. Furthermore, even if the shift of the clock temporally occurs as illustrated in the time chart in FIG. 14 and if the check signal CHK is fallen to logically low level in accordance with the shifting of the clock, that is even if the communication is forcefully stopped, the communication can return to normal condition by a periodically executing a synchronously initializing process (process of FIG. 17).

Fourth Embodiment

In the above-described embodiments, a pair of shift registers are provided in the serial communication block of each of the first and the second microcomputer 10 and 20, and their communication/non-communication condition (condition for being used as the sending register/condition for being used as the process register) are exchanged each other every the predetermined numbers of the clock. On the contrary, the structure of the serial communication block is modified.

Figure 18:
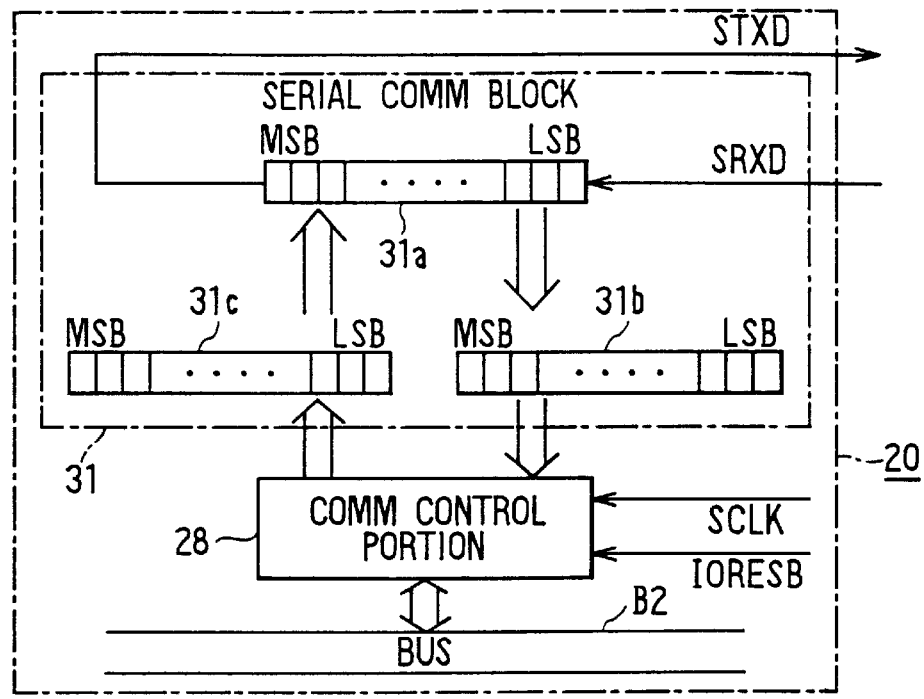
FIG. 18 is a schematic block diagram illustrating a structure of a serial communication block of a fourth embodiment.

As shown in FIG. 18, for example, a serial communication block 31 of the second microcomputer 20 is provided with a shift register 31a as a "first register" and two shift registers 31b, 31c as a "second register". Each of these registers is made up of 16 bits. Here, the communication control portion 28 transfers the data corresponding to 16 clocks, which is received by the shift register 31a, to the one of the process registers (shift register 31b), and registers the processed result in reply to the request command into another of the process registers (shift register 31c), so that the communication control portion 28 writes this processed result into the shift register 31a at the timing when 16 clocks passes.

In detail, a series of communication processes described below are performed. Here, since basic operation of the communication is substantially the same as that in FIG. 5, operation of this embodiment will be explained with reference to FIG. 5 (however, operation regarding the SW3, SW4 is not related).

(1) The data corresponding to 16 clocks is received by the shift register 31a in synchronization with the shift clock SCLK (period t2–t3).

(2) When the receiving of the data corresponding to 16 clocks is completed,
Data in the shift register 31a is immediately read to the process register 31b; and
Data in the process register 31c is immediately written to the shift register 31a (time t3).

(3) Processes (the A/D conversion of the assigned channel, the RAM write, the RAM read, etc) corresponding to the command in the process register 31b are performed, and the processed result is registered in the process register 31c (period t3–t4).

(4) At the same timing of the above (3), the next sending data corresponding the next 16 clocks is received by the shift register 31a (period t3–t4).

(5) After further 16 clocks passed, alike the above (2),
Data in the shift register 31a is immediately fetched to the process register 31b; and
Data in the process register 31c is immediately written to the shift register 31a (time t4).

(6) Alike the above (3), processes corresponding to the command in the process register 31b are performed, and the processed result is registered in the process register 31c (period t4–t5).

(7) At the same timing of the above (6), the next sending data corresponding the next 16 clocks are received by the shift register 31a. Instead, the processed result is sent to the first microcomputer 10. Afterwards, the above operations (5)–(7) are repeatedly performed until the shift clock SCLK is stopped.

According to this fourth embodiment, the process command immediately after receiving can be temporally escaped, and a predetermined process corresponding to the process command can be performed at the shift register at which the process command is escaped, by using the shift register 31a and the process registers 31b and 31c. Therefore, alike the first embodiment, when it takes long time to complete the process corresponding to the process command, it does not need to stop the communication every command. Hence the communication speed can be improved. Furthermore, it is not essential to ascertain whether a preparation of the communication has completed or not every communication corresponding 16 clocks. Therefore, it does not need to provide a slave response communication line (e.g., the EOCT line in JPA 9-282265), so that the structure can be simplified. Particularly, according to this embodiment, since a pair of the process registers 31b and 31c are used, it can effectively perform the writing/reading data.

Fifth Embodiment

In this fifth embodiment, the serial communication apparatus of the fourth embodiment is partly modified. As described the above, in the fourth embodiment, when the number of the clock reaches 16 clocks, the following steps are performed in this order.

Data in the shift register 31a is immediately fetched to the process register 31b; and Data in the process register 31c is immediately written to the shift register 31a (time t4).

Here, the process of "shift register←→process register" needs to be finished within a short time (0.5 μs, when SCLK=1 MHz), which corresponds to a period from a leading edge to a trailing edge of the shift register SCLK, so that high speed process is required. Therefore, a serial communication apparatus of this embodiment is constructed so that a data process of the "shift register←→process register" can be performed in a short period.

Figure 19:
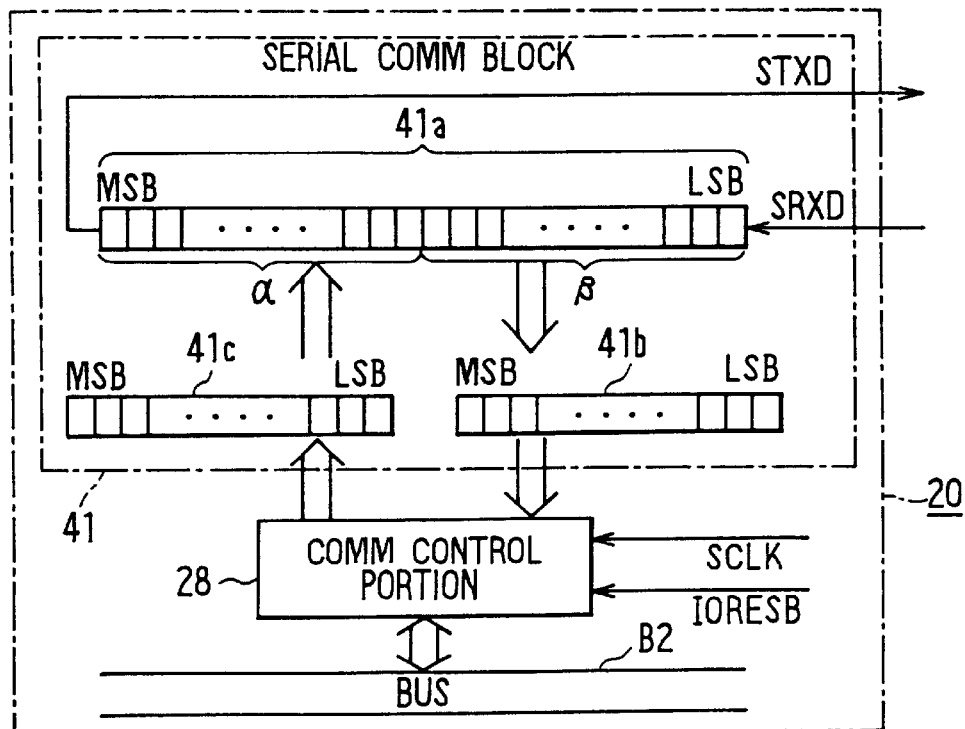
FIG. 19 is a schematic block diagram illustrating a structure of a serial communication block of a fifth embodiment.

FIG. 19 is a schematic block diagram illustrating a structure of a serial communication block of this embodiment. A serial communication block 41 of the second microcomputer 20 is provided with a shift register 41a having 32 bits as the "first register" and process registers 41b and 41c having 16 bits as the "second register". The shift register 41a is made up of a sending portion α constructed by upper 16 bits, and a receiving portion β constructed by lower 16 bits. The master signal SRXD sent from the first microcomputer 10 is written to the receiving portion β, and is read to the process register 41b every 16 clocks. Furthermore, the processed data from the process register 41c is written to the sending portion α, and is sent to the first microcomputer 10 as the slave signal STXD.

In detail, a series of communication processes described below are performed. Here, since basic operation of the communication is substantially the same as that in FIG. 5, operation of this embodiment will be explained with reference to FIG. 5 (however, operation regarding the SW3, SW4 is not related).

(1) The data corresponding to 16 clocks is received by the receiving portion β of the shift register 41a in synchronization with the shift clock SCLK (period t2–t3). In this time, the sending data is written to the LSB of the shift register 41a, and the MSB of the shift register 41a is sent to the first microcomputer 10.

(2) When the receiving of the data corresponding to 16 clocks is completed, and half of the data in the shift register 41a is exchanged,
Data in receiving portion β is immediately read to the process register 41b; and
At the same time, data in the process register 41c is immediately written to the sending portion α (time t3).

(3) Processes (the A/D conversion of the assigned channel, the Ram write, the Ram read, etc) corresponding to the command in the process register 31b are performed, and the processed result is registered in the process register 41c (period t3–t4).

(4) At the same timing of the above (3), the next sending data corresponding the next 16 clocks is received by the receiving portion β (period t3–t4).

(5) After further 16 clocks passed, alike the above (2),
Data in receiving portion β is immediately read to the process register 41b; and
At the same time, data in the process register 41c is immediately written to the sending portion α (time t4).

(6) Alike the above (3), processes corresponding to the command in the process register 41b are performed, and the processed result is registered in the process register 41c (period t4–t5).

(7) At the same timing of the above (6), the next sending data corresponding the next 16 clocks are received by the receiving portion β. Instead, the processed result is sent to the first microcomputer 10. Afterwards, the above operations (5)–(7) are repeatedly performed until the shift clock SCLK is stopped.

Here, the 16 bits data (process request) entered the receiving portion β at operation (1) is immediately read to the process register 41b at operation (2). In this case, since the data in the receiving portion β is not erased, the data is shifted to the sending portion a side at operation (4). After that, the data in the process register 41c is written to the sending portion α at operation (5), and the data is outputted as the slave signal STXD.

According to the fifth embodiment, since the shift register 41 has the sending portion α and the receiving portion β, a reading of the data from the receiving portion β to the process register 41b can be performed at the same time with a writing of the data from the process register 41c to the sending portion α, so that the process time can be shortened. Therefore, communication speed of the serial communication can be improved.

The present invention can be realized by the following modifications.

As described in the forth and fifth embodiment, the following processes may be further performed.

The second microcomputer 20 receives the communication synchronously initialize signal IORESB every a predetermined period; and When the second microcomputer 20 recognizes a wrong command in a received data, the second microcomputer sets the check signal CHK to H→L, and terminates the communication.

The shift register provided in the serial communication block may be a ling-buffer structure. The ling-buffer has a structure, which has 16 memory regions, so that the data of all regions can be replaced every 16 clocks.

In each of the embodiment, the serial communication apparatus has explained by exemplifying the vehicle engine ECU. However, the present invention is not limited to the above embodiments, and may be applied to the other communication systems. In other words, the present invention can be applied to any systems, particular to a serial communication system in which a process command is received from opposite side microcomputer and a processed result corresponding to the process command is sent, in synchronization with a serial communication clock, which is continuously generated every constant period.

What is claimed is:

1. A serial communication apparatus for performing serial communication in synchronization with a serial communication clock which being continuously inputted every a predetermined period, comprising:

a plurality of registers whose condition being switched between a communication condition and a non-communication condition;

a switcher for alternately switching the condition of the registers every a predetermined numbers of serial communication clock; and a communication controller for, when serial communication is performed by using one register under the communication condition, performing a process based on a process command, which is externally inputted and is received by another register last time, in the another register under the non-communication condition, and for outputting a process result in accordance with the process command.

2. A serial communication apparatus for performing serial communication in synchronization with a serial communication clock which being continuously inputted every a predetermined period, comprising:

a first register for communicating communication data including a process command;

a second register for temporally storing the communication data in the first register; and a communication controller for transferring the communication data in the first register to the second register when the first register receives communication data corresponding to a predetermined numbers of serial communication clock, for registering a process result in accordance with the process command included in the communication data into the second register, for transferring the process result in the second register to the first register after the predetermined numbers of serial communication clock passes, and for registering next communication data received after the predetermined numbers of serial communication clocks passes into the second register.

3. The apparatus of claim 2, wherein:

the second register comprises a pair of third registers, each of which is capable of storing data, which corresponds to the predetermined numbers of serial communication clock; and the communication controller transfers the communication data, which corresponds to the predetermined numbers of serial communication clock, received by the first register to one of the third registers, and registers the process result corresponding to the process command included in the communication data in the one of the third registers into the another of the third registers.

4. The apparatus of claim 3, wherein the first register includes:

a receiving portion for receiving the communication data corresponding to the predetermined numbers of serial communication clock; and a sending portion for sending the communication data corresponding to the predetermined numbers of serial communication clock.

5. The apparatus of claim 1, wherein a communication synchronously initialize signal is inputted to synchronize with the external microcomputer.

6. The apparatus of claim 1, wherein:

when a continuous A/D conversion request command is inputted, the apparatus performs a continuous A/D conversion and stores A/D conversion results into memory one by one independent of the serial communication;

during processes including the continuous A/D conversion and the storing the A/D conversion results, the apparatus performs the other process corresponding to the request command other than the continuous A/D conversion request command; and when the second microcomputer receives an A/D conversion result fetching command after the continuous A/D conversion completed, the apparatus outputs the A/D conversion results.

7. The apparatus of claim 1, wherein a stop signal for forcefully stopping the serial communication is outputted when an undefined wrong command is inputted.

8. The apparatus of claim 1, wherein the communication controller outputs the process result after temporally storing the process result in the another register under the non-communication condition.

9. A serial communication system comprising:

a first microcomputer being capable of outputting a process command; and a second microcomputer being connected with the first microcomputer to perform serial communication therebetween, for receiving the process command from the first microcomputer and outputting a process result in accordance with the process command in synchronization with a serial communication clock which being continuously inputted every a predetermined period, comprising:

a plurality of registers whose condition being switched between a communication condition and a non-communication condition;

a switcher for alternately switching the condition of the registers every a predetermined numbers of serial communication clock; and a communication controller for, when serial communication is performed by using one register under the communication condition, performing a process based on a process command, which is outputted from the first microcomputer and is received by another register last time, in the another register under the non-communication condition, and for outputting the process result.

10. A serial communication system comprising:

a first microcomputer being capable of outputting a communication data including a process command; and a second microcomputer being connected with the first microcomputer to perform serial communication therebetween, for receiving the communication data from the first microcomputer and outputting a process result in accordance with the process command included in the communication data in synchronization with a serial communication clock which being continuously inputted every a predetermined period, comprising:

a first register for communicating communication data with the first microcomputer;

a second register for temporally storing the communication data in the first register; and a communication controller for transferring the communication data in the first register to the second register when the first register receives communication data corresponding to a predetermined numbers of serial communication clock, for registering a process result corresponding to the process command included in the communication data into the second register, for transferring the process result in the second register to the first register after the predetermined numbers of serial communication clocks passes, and for registering next communication data received after the predetermined numbers of serial communication clocks passes into the second register.

11. A serial communication method of a serial communication system including:

a first microcomputer being capable of outputting a communication data including a process command; and a second microcomputer being connected with the first microcomputer to perform serial communication therebetween, for receiving the communication data from the first microcomputer and outputting a process result in accordance with the process command included in the communication data in synchronization with a serial communication clock which being continuously inputted every a predetermined period, the method comprising the steps of:

receiving a communication data from the first microcomputer by the second microcomputer, within a first period corresponds to a predetermined numbers of the serial communication clock;

performing a process corresponding to the process command included in the communication data by the second microcomputer, within a second period corresponding to the predetermined numbers of serial communication clock after the first period; and sending a process result in accordance with the process command from the second microcomputer to the first microcomputer within a third period corresponding to the predetermined numbers of serial communication clock after the second period.

12. The method of claim 11, wherein the method further comprising the steps of:

receiving a next communication data from the first microcomputer by the second microcomputer, within the second period;

performing a process corresponding to a next process command included in the next communication data by the second microcomputer, within the third period; and sending a next process result in accordance with the next process command from the second microcomputer to the first microcomputer within a fourth period corresponding to the predetermined numbers of serial communication clock after the third period.

13. A serial communication method using a serial communication apparatus being capable of performing serial communication in synchronization with a serial communication clock which being continuously inputted every a predetermined period, comprising the steps of:

receiving communication data including a process command by using a first register, within a first period corresponding to a predetermined numbers of serial communication clock;

performing a process in accordance with the process command included in the communication data and registering a process result to the second register, within a second period corresponding to the predetermined numbers of serial communication clock after the first period;

transferring the process result in the second register to the first register after the second period; and sending the process result by using the first register, within a third period corresponding to the predetermined numbers of serial communication clock after the second period.

* * * * *